US011113918B2

(12) United States Patent
Stark

(10) Patent No.: US 11,113,918 B2
(45) Date of Patent: Sep. 7, 2021

(54) METHOD FOR SECURING VALUE DOCUMENTS USING STORAGE PHOSPHORS

(71) Applicant: GIESECKE+DEVRIENT CURRENCY TECHNOLOGY GMBH, Munich (DE)

(72) Inventor: Martin Stark, Munich (DE)

(73) Assignee: GIESECKE+DEVRIENT CURRENCY TECHNOLOGY GMBH, Munich (DE)

( * ) Notice: Subject to any disclaimer, the term of this patent is extended or adjusted under 35 U.S.C. 154(b) by 374 days.

(21) Appl. No.: 16/307,628

(22) PCT Filed: Jun. 8, 2017

(86) PCT No.: PCT/EP2017/000668
§ 371 (c)(1),
(2) Date: Dec. 6, 2018

(87) PCT Pub. No.: WO2017/211456
PCT Pub. Date: Dec. 14, 2017

(65) Prior Publication Data
US 2019/0164373 A1 May 30, 2019

(30) Foreign Application Priority Data
Jun. 8, 2016 (DE) .......................... 102016007063.3

(51) Int. Cl.
*G07D 7/1205* (2016.01)
*G06K 19/14* (2006.01)
(Continued)

(52) U.S. Cl.
CPC ........... *G07D 7/1205* (2017.05); *B42D 25/29* (2014.10); *B42D 25/415* (2014.10);
(Continued)

(58) Field of Classification Search
CPC .... G07D 7/1205; B42D 25/29; B42D 25/415; C09K 11/7767; C09K 11/7774; G01N 21/64; G06K 19/14
See application file for complete search history.

(56) References Cited

U.S. PATENT DOCUMENTS 4,387,112 A * 6/1983 Blach ........................ G07F 7/08
283/901
2007/0031685 A1* 2/2007 Ko ..................... C09K 11/7774
428/447

(Continued)

FOREIGN PATENT DOCUMENTS

DE 102011010756 A1 3/2012
EP 1316924 A1 6/2003
(Continued)

OTHER PUBLICATIONS

Sato et al. WO 2014/132415 A1—Google Patents English Translation obtained Feb. 1, 2021 (Year: 2021).*

(Continued)

*Primary Examiner* — David P Porta
*Assistant Examiner* — Jeremy S Valentiner
(74) *Attorney, Agent, or Firm* — Workman Nydegger

(57) ABSTRACT

A method for checking an authenticity feature having an optical storage phosphor, to an apparatus for checking, an authenticity feature and to a value document having an authenticity feature. The authenticity feature has an optical storage phosphor. In one step, the optical storage phosphor is subjected to at least one query sequence, respectively comprising at least a first readout process and a second readout process. At least a first and a second readout measurement value are captured, which respectively are based on the detection of an optical emission in response to the respectively first or the respectively second associated readout process. A readout measurement value time series is (Continued)

created and is respectively associated with the at least one query sequence, comprising at least the first readout measurement value respectively associated with the first readout process and the second one respectively associated with the second readout process.

23 Claims, 10 Drawing Sheets

(51) Int. Cl.
  *G01N 21/64* (2006.01)
  *B42D 25/29* (2014.01)
  *C09K 11/77* (2006.01)
  *B42D 25/415* (2014.01)

(52) U.S. Cl.
  CPC ...... *C09K 11/7767* (2013.01); *C09K 11/7774* (2013.01); *G01N 21/64* (2013.01); *G06K 19/14* (2013.01)

(56) References Cited

U.S. PATENT DOCUMENTS

| | | |
|---|---|---|
| 2007/0267581 A1 | 11/2007 | Roth |
| 2014/0197241 A1* | 7/2014 | Lawandy ........... G06K 19/0614 235/488 |
| 2016/0078028 A1* | 3/2016 | Pawlik ............... G01N 21/6447 382/209 |
| 2016/0125682 A1 | 5/2016 | Rapoport et al. |

FOREIGN PATENT DOCUMENTS

| | | |
|---|---|---|
| GB | 2095822 A | 10/1982 |
| WO | 2007003531 A1 | 1/2007 |
| WO | 2008113963 A1 | 9/2008 |
| WO | 2010064965 A1 | 6/2010 |
| WO | 2014132415 A1 | 9/2014 |

OTHER PUBLICATIONS

Garlick, "Phosphors and Phosphorescence," Reports on Progress in Physics, vol. 12, No. 34, 1949, pp. 34-55.
Urbach et al., "On Infra-Red Sensitive Phosphors," Journal of the Optical Society of America, vol. 36, No. 7, Jul. 1946, pp. 372-381.
Liu et al., "Photostimulated Near-Infrared Persistent Luminescence as a New Optical Read-Out from Cr3+-Doped LiGa5O8," Scientific Reports, vol. 3, No. 1554, 2013, 18 Pages.
Katsumata et al., "Trap Levels in Eu-Doped SrAL2O4 Phosphor Crystals Co-Doped with Rare-Earth Elements," Journal of the American Ceramic Society, vol. 89, No. 3, 2006, pp. 932-936.
Yukihara et al., "Optically Stimulated Luminescence Fundamentals and Applications," John Wiley & Sons, 2011, 101 Pages.
Ronda et al., "Luminescence from Theory to Applications," WILEY-VCH Verlag Gmbh & Co. KGaA, 2008, 7 Pages.
McKeever et al., "Thermoluminescence of Solids," Cambridge University Press, 1985, 15 Pages.
Chen et al., "Theory of Thermoluminescence and Related Phenomena," World Scientific Publishing Co. Pte. Ltd., 1997, 82 Pages.
International Search Report from PCT Application No. PCT/EP2017/000668, dated Sep. 7, 2017.
German Search Report from DE Application No. 102016007063.3, dated Feb. 23, 2017.

* cited by examiner

METHOD FOR SECURING VALUE DOCUMENTS USING STORAGE PHOSPHORS

BACKGROUND

The invention relates to an authenticity evaluation method which utilizes the optically stimulated luminescence (OSL) of optical storage phosphors as an authenticity feature. The invention relates further to an apparatus for carrying out the authenticity evaluation method, to a reference library containing optical storage phosphors in combination with their characterizing measurement sequences, to these optical storage phosphors as authenticity features and to value documents having such authenticity features.

The safeguarding of value documents against forgeries by means of authenticity features is known. There are feature substances which are based, e.g., on magnetic, thermal, electric, and/or optical (e.g. absorption and emission) effects which can be specifically proven. In particular, the feature properties do not change by the proof: the repeated carrying out of the same measurement at the same place delivers the same result. Such feature systems can be described as memory-free.

Examples of optical storage phosphors as authenticity features are known. In EP1316924 the checking method is effected via the detection of photoluminescence or via the occurrence of optically stimulated luminescence. An inorganic storage phosphor and an upconverter phosphor are used in WO2010064965. DE102011010756 describes manufacturing methods for nanoparticulate storage phosphors and their possible employment as a marker. The above-described methods do without a quantitative evaluation of the dynamic and characteristic storage behaviour of an optical storage phosphor as an authenticity feature and instead are based on reproducible measurements at defined states.

The disadvantage of the safeguarding by these authenticity evaluation methods is that also an imitator is able to characterize the optical storage phosphor by usual measuring methods of spectroscopy and thus is potentially put in a position to collect information which makes an imitation of the substance easier to him. A successful imitation of the substance would then also pass the authenticity check.

SUMMARY

The invention is based on the object of providing an authentication and evaluation method of an item, in particular value document, which utilizes a feature system which via the close linkage with the processes of authenticity evaluation is highly specific, so that it cannot be identified with the usual spectroscopy methods and thus offers an increased security against imitation.

A further object of the invention relates to the provision of an authentication and/or evaluation method for a value document, which utilizes a feature system which enables a still more differentiated differentiation of similar feature substances and thus offers an increased security.

The object is also based on the object of providing an apparatus for carrying out the method.

A further object relates to the provision of an authenticity feature improved with respect to forgery resistance, as well as to a value document having this authenticity feature.

An additional object relates to an authentication and/or evaluation method for a selected currency, so that a tracking of batches, an identification of the production place or of a manufacturer is made possible to guarantee in this way an improved retraceability of the authenticity features contributing to the value document.

First Main Aspect of the Invention 1. (First aspect of the invention) Method for checking an authenticity feature having an optical storage phosphor, comprising the following steps of:

a. subjecting the optical storage phosphor to at least one query sequence, respectively comprising at least a first readout process and a second readout process;

b. capturing respectively at least a first and a second readout measurement value, which respectively are based on the detection of an optical emission in response to the respectively first or the respectively second associated readout process;

c. creating a readout measurement value time series respectively associated with the at least one query sequence, comprising at least the first readout measurement value respectively associated with the first readout process and the second one respectively associated with the second readout process; and d. evaluating the readout measurement value time series respectively associated with the query sequence for determining a dynamic behaviour from the readout measurement value time series under the respectively associated query sequence.

2. (Preferred configuration) Method according to clause 1, wherein the optical storage phosphor has light centers and trap centers, wherein, preferably, charge carriers present in the storage phosphor are at least partially available or stored at the trap centers before step a. and wherein the charge carriers stored at the trap centers transition at least partially from the trap centers to the light centers by means of the query sequence in step a. By a readout process the trap states are at least partially depopulated, as a result of which the readout measurement values can be captured. The light centers and trap centers are optically autonomous states of the optical storage phosphor. Preferably, during the subjecting in step a. the optical storage phosphor hast at least at times an electrical conductivity, which is different, preferably higher than outside the subjecting in step a. In particular, the electric conductivity changes during the subjecting to the query sequence.

Upon an optical readout process, the wavelength of the light employed for the readout process is preferably longer than the wavelength of the light employed for a charging process. With such a configuration, in particular with use of the optical storage phosphor in a paper substrate, an excitation and luminescence of the paper substrate can be avoided.

In a second preferred embodiment, the wavelength of the light employed for the readout process is shorter than the wavelength of the light employed for a charging process. This is advantageous in particular upon the identification and differentiation of several optical storage phosphors.

3. (Preferred configuration) Method according to any of clauses 1 to 2, wherein the step a. comprises two query sequences which respectively comprise at least a first readout process and a second readout process, preferably three to five query sequences which are carried out preferably successively, in parallel, or temporally overlapping. The at least two readout processes have preferably different wavelength. The readout measurement values captured in step b. are different for each query sequence.

4. (Preferred configuration) Method according to any of clauses 1 to 3, wherein in step d. the evaluation of the readout measurement value time series, in particular of the at least one readout measurement value time series, is effected quantitatively to determine at least one characteristic memory property of the optical storage phosphor; the quantitative evaluation of the dynamic behaviour preferably serves for enabling an evaluation for temporal dynamic quantities on the basis of which the memory properties of the optical storage phosphor can be described.

5. (Preferred configuration) Method according to any of clauses 1 to 4, wherein each readout process comprises at least one readout pulse or a continuous readout intensity-modulated over time; preferably at least one, preferably each readout process comprises two or more readout pulses, particularly preferably three to eight or four to twenty.

6. (Preferred configuration) Method according to any of clauses 1 to 5, wherein the query sequence comprises at least a third or a fourth readout process, preferably four or more, particularly preferably at least eight or at least ten, readout processes; furthermore at least one, preferably the several readout processes comprise at least four readout pulses.

7. (Preferred configuration) Method according to any of clauses 1 to 6, further comprising at least one charging sequence comprising at least one first charging process for subjecting the optical storage phosphor temporally before the at least one query sequence; a charging process comprises preferably at least one charging pulse or a continuous charging intensity-modulated over time, particularly preferably two or more charging pulses, particularly preferably three to eight. In doing so, upon subjecting the optical storage phosphor, the charge carriers of the storage phosphor are excited at least partly, preferably nearly completely, with the at least one charging process at the light centers, transition to trap centers and are stored there.

8. (Preferred configuration) Method according to any of clauses 4 to 7 in combination with clause 4, wherein the at least one characteristic memory property is selected from: persistence, memory depth, memory strength, sensitivity, specificity, exchangeability, association, continuity, latency, saturation, isolation, charging speed and/or readout speed.

9. (Preferred configuration) Method according to any of clauses 4 to 8, wherein the step of evaluating the readout measurement value time series, in particular of the at least one readout measurement value time series, for at least one of the at least one characteristic memory property of the optical storage phosphor comprises a determination of the shape of the temporal course of the curve of the readout measurement value time series or a determination of parameters which describe the temporal course of the curve of the readout measurement value time series.

10. (Preferred configuration) Method according to any of clauses 1 to 9, wherein in the readout measurement value time series, in particular the at least one readout measurement value time series, of at least two readout measurement values the decay time of the emission on the first readout process is so long, that the emission on the first readout process is superimposed on the emission of the second readout process.

11. (Preferred configuration) Method according to any of clauses 4 to 10, wherein the optical storage phosphor has more than one different characteristic memory property.

12. (Preferred configuration) Method according to any of clauses 1 to 11, wherein at least a first readout process and a second readout process differ in at least one of the properties: wavelength, spectral form, intensity, pulse form and pulse distance; the first and/or second readout process preferably comprise at least two readout pulses, at least a first readout pulse and second readout pulse having at least two spectrally separate readout wavelengths; it is in particular preferred that the first wavelength is near the maximum of a band of the readout spectrum and at least one second wavelength is shifted relative to the first wavelength by at least a full width at half maximum of this band; it can further be preferred that the wavelength of the first and at least one second readout pulse address different bands of the readout pulse.

13. (Preferred configuration) Method according to any of clauses 1 to 12, wherein at least a first readout process and a second readout process have at least two spectrally separate readout wavelengths; preferably, the second readout process is effected in temporal order after the first readout process; particularly preferably, each readout process comprises at least two readout pulses, particularly preferably, the first pulse is effected in temporal order before the second pulse.

14. (Preferred configuration) Method according to any of clauses 1 to 13, wherein the optical storage phosphor is subjected to two or three query sequences, wherein each query sequence has assigned thereto at least one readout measurement value time series, preferably three to ten, particularly preferably five to twenty. In particular, the optical storage phosphor can be subjected to three or more query sequences. The readout measurement value time series belonging to the respective query sequences preferably differ from each other.

15. (Preferred configuration) Method according to any of clauses 4 to 14, wherein the optical storage phosphor has several characteristic memory properties and is subjected to several query sequences, wherein each query sequence has at least one readout measurement value time series assigned thereto.

16. (Preferred configuration) Method according to any of clauses 1 to 15, wherein the optical storage phosphor is subjected to several query sequences, wherein the several query sequences differ in at least one of the properties: local application of the readout process, temporal application of the readout process, spectral application of the readout process, pulse duration of the readout process, pulse form of the readout process, pulse distance of the readout process and/or pulse order of the readout process.

17. (Preferred configuration) Method according to any of clauses 1 to 16, comprising a step of e. matching the determined dynamic behaviour or the characteristic memory property from the readout measurement value time series, in particular of the at least one readout measurement value time series, with at least one reference value, and f. recognizing the authenticity of the authenticity feature from the matching e. upon sufficient conformity with the reference value.

18. (Second aspect of the invention) Apparatus for carrying out a method according to any of clauses 1 to 17, comprising:

a first light source suitable for subjecting the authenticity feature, in particular in the region of the optical storage phosphor, to at least one query sequence and/or to at least one charging sequence and/or to a preparation step;

a measuring device with one or several detection devices adapted for capturing the light emission of the optical storage phosphor in at least one first spectral region of its emission spectrum.

19. (Preferred configuration) Apparatus according to clause 18, wherein the apparatus has a second light source suitable for subjecting the authenticity feature in the region of the optical storage phosphor to a query sequence and/or charging sequence according to any of clauses 1 to 18, wherein the second light source emits at a wavelength which differs from the emission wavelength of the first light source.

20. (Third aspect of the invention) Authenticity feature having an optical storage phosphor for checking the authenticity of the feature with a method according to any of clauses 1 to 17, wherein the optical storage phosphor has a readout spectrum with at least one distinctive spectral structure which in the stimulation efficiency is configured varying with the wavelength, wherein the readout spectrum has at least one local minimum, in which the stimulation efficiency is reduced by at least 10% in comparison to the flanking maxima, preferably, the stimulation efficiency is reduced by at least 30% in comparison to the flanking maxima.

21. (Fourth aspect of the invention) Value document having at least one authenticity feature according to clause 20, wherein the value document is preferably a bank note having an authenticity feature; particularly preferably the value document has a substrate made of paper and/or plastic, more preferably the authenticity feature is incorporated in the volume of the value document and/or applied on the surface of the value document.

Second Main Aspect of the Invention 1. (First aspect of the invention) Method for checking an authenticity feature having an optical storage phosphor, comprising the steps of:
a. capturing at least a first measurement value, in particular a light intensity and/or a light emission of the optical storage phosphor;
b. subjecting the optical storage phosphor to at least one charging process;
c. capturing at least a second measurement value, in particular of a light emission of the optical storage phosphor; and
d. quantitatively determining an effect of the charging process on the optical storage phosphor from the at least one first and second measurement value. Preferably, for determining the effect at least the first and the second measurement value are required. In another preferred embodiment, the effect of the charging process on the optical storage phosphor is determined from preferably one single measurement value.

Preferably, the at least first and second measurement value are respectively a light emission of the optical storage phosphor, particularly preferably the measurements are carried out at different wavelengths.

2. (Preferred configuration) Method after the second main aspect of the invention according to clause 1, wherein the optical storage phosphor has light centers and trap centers, wherein, preferably, charge carriers present in the storage phosphor are at least partially transferred to the trap centers by the charging process in step b. and there are stored at trap states or are available there. The light centers and trap centers preferably are optically autonomous states of the optical storage phosphor.

3. (Preferred configuration) Method according to clause 1 or 2, wherein the method comprises at least one readout process and the first and/or second measurement value are captured independently of a readout process.

Here, the second measurement value, as a physically causal reaction to the charging process, is preferably different from the first measurement value.

4. (Preferred configuration) Method according to clause 1 to 3, wherein the method comprises at least one readout process and the at least first and/or second measurement value is captured as first and/or second readout measurement value based on a detection of a light emission in response to the at least one readout process, wherein, preferably, the first measurement value is captured as a readout measurement value based on a detection of a light emission in response to a first readout process and the second measurement value as a readout measurement value based on a detection of a light emission in response to a second readout process.

Upon an optical readout process, the wavelength of the light employed for the readout process is preferably longer than the wavelength of the light employed for a charging process. With such a configuration, in particular with use of the optical storage phosphor in a paper substrate, an excitation and luminescence of the paper substrate can be avoided.

In a second preferred embodiment, the wavelength of the light employed for the readout process is shorter than the wavelength of the light employed for a charging process. This is advantageous in particular upon the identification and differentiation of several optical storage phosphors.

5. (Preferred configuration) Method according to clause 2 in connection with clause 3 or 4, wherein by the at least one readout process at the trap centers, stored charge carriers of the trap centers are excited and they transition to the light centers, the charge carriers radiantly relaxing at the light centers.

6. (Preferred configuration) Method according to any of claims 3 to 5, wherein the method has at least one query sequence, comprising at least two readout processes, wherein from the first readout process at least a first readout measurement value and from the second readout process at least a second readout measurement value are captured; and the method comprises the steps of:
d. creating a readout measurement value time series respectively associated with the at least one query sequence, comprising at least the first readout measurement value respectively associated with the first readout process and the second one respectively associated with the second readout process; and
e. evaluating the readout measurement value time series respectively associated with the query sequence for determining a dynamic behaviour from the readout measurement value time series under the respectively associated query sequence.

7. (Preferred configuration) Method according to any of clauses 1 to 6, wherein at least one charging process comprises at least one charging pulse or a continuous charging intensity-modulated over time; a charging process comprises preferably two or more charging pulses, more preferably three to eight or four to twenty, which are carried out preferably successively, in parallel, or temporally overlapping, particularly preferably at different wavelengths of the at least two readout processes.

8. (Preferred configuration) Method according to any of clauses 6 or 7 in combination with clause 6, wherein step b. comprises two query sequences which respectively comprise at least a first readout process and a second readout process which are carried out preferably successively, in parallel, or temporally overlapping, particularly preferably at different wavelengths of the at least two readout processes and/or of the detection of the optical emission. The captured readout measurement values or the captured readout measurement value time series are preferably different for each query sequence.

9. (Preferred configuration) Method according to any of clauses 6 to 8 in combination with clause 6, wherein in step d. the evaluation of the readout measurement value time series is effected quantitatively to determine at least one characteristic memory property of the optical storage phosphor; the quantitative evaluation of the dynamic behaviour preferably serves for enabling an evaluation for temporal dynamic quantities on the basis of which the memory properties of the optical storage phosphor can be described.

10. (Preferred configuration) Method according to any of clauses 3 to 9 in combination with clause 3 or 4, wherein at least one, preferably each readout process comprises at least one readout pulse or a continuous readout intensity-modulated over time; preferably at least one, preferably each readout process comprises two or more readout pulses, particularly preferably three to eight or four to twenty.

11. (Preferred configuration) Method according to any of clauses 6 to 10 in combination with clause 6 or 7, further comprising at least one charging sequence comprising at least one first charging process for subjecting the optical storage phosphor temporally before the at least one query sequence; a charging process comprises preferably at least one charging pulse or a continuous charging intensity-modulated over time, particularly preferably two or more charging pulses, particularly preferably three to eight.

12. (Preferred configuration) Method according to any of clauses 3 to 11 in combination with one of the clauses 3 or 4, comprising a repeated and/or respectively alternating succession of the at least one charging process and of the at least one readout process; the processes respectively comprise preferably pulses, i.e. at least a first charging pulse or at least a first readout pulse.

13. (Preferred configuration) Method according to any of clauses 9 to 12 in combination with clause 9, wherein the at least one characteristic memory property is selected from: persistence, memory depth, memory strength, sensitivity, specificity, exchangeability, association, continuity, latency, saturation, isolation, charging speed and/or readout speed.

14. (Preferred configuration) Method according to any of clauses 6 to 13 in combination with clause 9, wherein the step of evaluating the readout measurement value time series for at least one characteristic memory property of the optical storage phosphor comprises a determination of the shape of the temporal course of the curve of the readout measurement value time series or a determination of parameters which describe the temporal course of the curve of the readout measurement value time series.

15. (Preferred configuration) Method according to any of clauses 1 to 14, wherein at least one charging process differs from another charging process at least in the wavelength and/or intensity and/or pulse length.

16. (Preferred configuration) Method according to any of clauses 1 to 15 in combination with clause 7, wherein at least one first charging pulse differs from another charging pulse at least in the pulse duration and/or pulse interval duration.

17. (Preferred configuration) Method according to any of clauses 1 to 16, wherein by subjecting the optical storage phosphor to at least one charging sequence and/or at least one preparation step a threshold value emission is set, preferably a defined output signal, particularly preferably a defined intensity of the optical emission under a defined readout process.

18. (Preferred configuration) Method according to any of clauses 6 to 17 in combination with clause 6, wherein by the readout measurement value time series of at least two readout measurement values the charging speed of the optical storage phosphor is determined.

19. (Preferred configuration) Method according to any of clauses 1 to 18, comprising the step of
f. matching the determined dynamic behaviour from the readout measurement value time series with at least one reference, as well as g. recognizing the authenticity of the authenticity feature as a function of the matching f.

20. (Preferred configuration) Method according to any of clauses 1 to 19, comprising the step of
h. subjecting the optical storage phosphor with at least one thermalizing sequence.

21. (Second aspect of the invention) Authenticity feature having an optical storage phosphor for checking the authenticity of the authenticity feature with a method according to any of clauses 1 to 20, wherein the optical storage phosphor has a charging spectrum with at least one distinctive spectral structure which in the charging efficiency is configured varying with the wavelength, wherein the readout spectrum has at least one local minimum, in which the charging efficiency is reduced by at least 10%, preferably by at least 30%, in comparison to the flanking maxima.

22. (Third aspect of the invention) Value document with at least one authenticity feature according to clause 21, wherein the value document is preferably a bank note having an authenticity feature; particularly preferably, the value document has a substrate made of paper and/or plastic, more preferably the authenticity feature is incorporated in the volume of the value document and/or applied on the surface of the value document.

Even if here a first main aspect and a second main aspect are described separately, a combination or partial combination of first and second and/or at least one of the aspects regarding the first and/or second main aspects is conceivable.

DETAILED DESCRIPTION OF THE INVENTION

Value documents within the context of this invention are objects such as bank notes, checks, shares, value stamps, identity cards, passports, credit cards, deeds and other documents, labels, seals, and objects to be safeguarded such as jewelry, optical data carriers, CDs, packages and the like. The value-document substrate need not necessarily be a paper substrate, but might also be a plastic substrate or a substrate having both paper constituents and plastic constituents. The preferred area of application is bank notes based in particular on a paper substrate and/or plastic substrate.

Optical storage phosphors for safeguarding value documents are known in the prior art. The present invention is based on the idea to use the properties of the dynamic time behaviour of optical storage phosphors (OSL substances) for the proof of authenticity of a value document. For this, at least one OSL substance is selected, which with respect to at least one property and at least one measuring process has a memory.

In an OSL substance, measurable properties depend on the previous history, that is, a measurement influences the result of the subsequent measurement. This is designated as a memory. From the employment of memory-type substance systems as an authenticity feature there results a close coupling between authenticity feature and proving process: In the proof process, by employing measuring processes (that is, charging and/or readout processes), in particular by successions (also referred to as sequences) of equal and/or different charging and/or readout processes, a specific history is impressed on the OSL substance and the specific dynamic behaviour of the memory-type system is checked for this history. As due to this the order of events influences the system behaviour, memory can also be understood as a path dependence of the system.

A path dependence of the system can be present in particular in the case of a non-commutativity of two measuring processes. For example, the optical storage phosphor is read out with a first and a second readout process. Here, it is possible that the first readout process influences the system in such a way that the result of the second readout process depends on the first readout process. A change of the order of the readout processes then leads preferably to a different result.

Preferably, in an optical storage phosphor, in the charging process, charge carriers are stored at energetically differently located trap centers. Particularly preferably, by different charging processes, which differ preferably in their intensities, durations, pulse forms and/or (optical) wavelengths, the distribution of the charge carriers over the trap centers can be influenced. Additionally, the distribution of the charge carriers stored at trap centers changes by internal relaxations and in particular by external influences, such as for example temperature. As not only the influence of one single charging process influences the distribution but also the temporal succession of several charging processes, the charge distributions over the trap centers are established as a consequence of different charging paths, which illustrates the above-mentioned path dependence.

Likewise, preferably, the distribution of the charge carriers can be influenced by different readout processes, which differ preferably in intensity, duration, pulse form and/or wavelength, and different successions of readout processes as well as by different successions of mixtures of charging and readout processes.

In which specific manner an OSL substance reacts to a concrete charging pulse or readout pulse or in particular to a concrete succession of charging pulses and/or readout pulses, represents the information which is hidden for the uninitiated imitator and is used according to the invention in the proof process.

For this purpose, from charging and readout processes, sequences are built which are suitable for determining characteristic memory properties of the OSL substance (example: successively continued execution of measuring optically stimulated luminescence (OSL) to determine a memory strength).

In a suitable detector the value document marked according to the invention is measured with one or several sequences and from the associated results characteristic memory properties are determined. By comparison with a specification authenticity is proven (example: in an OSL substance memory strength, exchangeability rules and sensitivity are determined with different sequences with a sensor realizing at least one charging and two different readout processes and are compared with the specification).

The proof of authenticity is thus shifted from a static parameter space (which consists of, for example, intensities, spectral distribution and lifetime) to a temporal procedure. The specificity of the memory of the OSL substance must suit the specificity of the history impressed by the sensor, in order for the authenticity to be proven positively. For implementation, according to the invention there are proposed OSL substances as authenticity features for authentication, for the authenticity evaluation several memory properties being used (preferably several ≥2, 3 . . . different characteristic properties or one characteristic property in several ≥2, 3 . . . different measuring parameters). While proving, a history is impressed on the OSL substance, by one or several selected (same or different) charging or query sequences of charging or readout processes being applied to the system. From the reaction/response of the OSL substance to this one or several sequence(s) the dynamic behaviour is determined and used for authenticity evaluation.

A measurement value relates to a characteristic property of the storage phosphor. The measurement value describes preferably a storage charge, particularly preferably light emission, of the storage phosphor. The measurement value can be captured at an arbitrary or firmly specified point in time. For example, before, during or after a readout process one or several measurement values can be captured. According to one configuration, the first measurement value regarding the storage phosphor is captured, subsequently the storage phosphor is subjected to a charging process, the charging process comprising one or several charging pulses, and subsequently thereto the second measurement value is captured. Basically the first and/or second measurement value can be captured independently of other processes of the method. In one configuration, at least the first and/or the second measurement value are associated with the readout process, so that this first and/or second measurement value is defined as the first or the second readout measurement value, respectively.

The first and the second measurement value can be used for the authenticity evaluation, for example by comparison with reference data. Furthermore, the use of at least one of the measurement values for controlling the charging process is conceivable. The at least one measurement value (in particular the first measurement value) can be integrated in a control circuit, contents of the at least one measurement value influencing parameters of the charging process, for example a wavelength or a region of wavelengths, a pulse duration of a pulse, the number of pulses and/or the form of one or several pulses for charging the storage phosphor. Furthermore, at least one of the measurement values can be used as a trigger, for example for actuating an event and/or a process, e.g. readout process.

In one embodiment, the method comprises at least one readout process. The at least one first and/or second measurement value is based on a detection of a light emission in response to at least one readout process. Such captured measurement values are defined as readout measurement values. Preferably, the method comprises at least two readout processes, wherein for each readout process at least one readout measurement value is captured.

If several readout process are carried out, these can be brought together in a query sequence. The readout processes of a query sequence are preferably a capturing of coherent readout measurement values. The method may comprise one or several query sequences. For illustrating the division of the query sequences, a query sequence is represented schematically by way of example in the following diagram. A query sequence comprises at least one first and one second readout process. Preferably, readout processes comprise at least one pulse a1 (or a2, a3, . . . , respectively). In a variant of the invention, within the framework of a readout process several pulses are grouped, whereby for each readout process, but not necessarily for each pulse, at least one readout measurement value is generated. The readout measurement values captured by the readout processes are recorded in temporal order. From these readout measurement value time series captured in step c.) of the method there result in turn readout curves which on account of their form or by parameters which are derived from the curves are used for authenticity evaluation.

Alternatively, in one readout process or in several readout processes there is captured not only one single readout measurement value but several readout measurement values and are ordered according to their temporal succession into the readout measurement value time series. A sequence of several readout processes yields a query sequence. Analogously, several charging processes may yield a charging sequence.

The readout process or the charging process in combination with a measurement forms a measuring process. The result of a measuring process, such as e.g. of a readout process, is a signal S which depends on the process P, i.e. S(P), and relevantly characterizes the optical storage phosphor (for example, the spectrally resolved measurement of a light emission of a luminescent substance). The measuring process is established by the measuring system and by associated measuring parameters.

Dynamic behaviour is understood to be the time dependence of a measurand. From different measurands different time dependencies can be determined. Preferably, the quantitative evaluation of the dynamic behaviour serves for enabling an evaluation for temporal dynamic quantities. Dynamic temporal measurands are measurands which are linked with each other at least in time and in a further physical property of a measurement. The time dependence of a measurand is reflected in the associated readout measurement value time series. At least one characteristic memory property of the corresponding optical storage phosphor can be determined by a quantitative evaluation of the readout measurement value time series, and this in turn can serve as an authenticity feature for the differentiation.

Reference readout measurement value time series can be deposited, for example, in a look-up table and be used for matching captured readout measurement value time series in a method for the differentiation of optical storage phosphors.

A reference library comprises at least such sequences, parameters and the corresponding tables, which are suitable for being employed in relevantly discriminating proofs of authenticity for various features belonging to an OSL substance.

Optical Storage Phosphors as Authenticity Feature

For a safeguarding according to the invention, for example of a value document, a selected optical OSL substance is incorporated as an authenticity feature into the value document or into a foil element in the form of an additive to the substrate (paper or polymer) and/or is applied onto the value document in the form of a printing ink or coating composition. (Example: thermochromic substance in printing ink, OSL substance in paper substrate). Alternatively or additionally, also the incorporation of the OSL substance in or coating the OSL substance on a metallic or metallized foil is conceivable. Furthermore, the OSL substance can be used as an additive of a coating of the substrate or of a further layer of the value document, in particular in a composite material from several single layers which form the substrate and or the value document. Of course, also a combination of at least two of the represented examples of a use of the storage phosphor can be applied. Basically, the form factor of the value document is not limited to an areal, sheet-shaped configuration.

In the OSL substance there cooperate typically two optically active systems in the solid. In particular, the two optically active systems can be light centers and trap centers in a solid. The light centers form the first light-emitting system. In the second system consisting of the trap centers, charge carriers can be stored in a stable fashion in the electronic ground state of the trap centers.

In the OSL substance there exist trap centers from which the stored charge carriers are not released to a significant extent by the thermal energy at ambient temperature. According to the invention, the mean dwell time (persistence) of the charge carriers in these trap centers at ambient temperature is longer than the duration of the authenticity evaluation method. The authenticity evaluation takes place preferably in a bank note processing apparatus, for example, at a central bank. In such machines, an authenticity evaluation mostly takes place within less than 0.1 s, in particular in a region of less than 0.05 s. When checking identity documents, the authenticity evaluation can also last longer than 1 s. Depending on the intended use, it is advantageous that the persistence corresponds to at least the time of the authenticity evaluation. Preferably, the persistence is longer than the fivefold duration of the authenticity evaluation method, particularly preferably longer than the hundredfold duration. Preferably, the persistence is longer than 10 ms, particularly preferably longer than 1 s, and still more preferably longer than 5 min.

The release of the charge carriers stored in these trap centers only occurs through the supply of a suitable energy amount, e.g. by the irradiation with light (readout process). The released charge carriers at a light center can then relax under the emission of light (light emission upon readout).

In delimitation over phosphorescence, in which in the light center itself excited charge carriers are brought into a triplet state and from this spontaneously relax with a characteristic time constant into another state of the light center, in an OSL substance upon being subjected to a charging process charge carriers transition from light centers to trap centers different therefrom. Light centers and trap centers differ by their spatial position and/or their chemical identity. Preferably, light centers and trap centers are different dopant-ions. Upon readout, charge carriers transition from trap centers to light centers and can there radiantly relax under the emission of luminescence. A charging of the OSL substance may correspond, for example, to an oxidation of the light centers and reduction of the trap centers. Vice versa, the readout process may correspond to a reduction of the light centers and oxidation of the trap centers.

The transition of the charge carriers from the trap centers to the light centers is thus in particular not a spontaneous transition, in which an excited state intrinsically, i.e. without external influences, de-excites. Rather it is preferred that the transition of the charge carriers from the trap centers to the light centers (or also vice versa from the light centers to the trap centers) must be stimulated by external action, such as a charging process and/or a readout process. Hence, in connection with the readout of OSL substances one also speaks of optically stimulated luminescence (OSL)

In the charging process and/or in the readout process, the storage phosphor preferably has a changed light-induced electric conductivity which is due to the movement of the charge carriers. It is particularly preferred, that the electric conductivity of the OSL substance alters during the charging process and/or during the readout process. Preferably, during the charging process and/or during the readout process the OSL substance shows a maximum electrical conductivity which is higher, in particular at least 50% higher than outside these processes. In other words, during the subjecting to the query sequence, in particular during the subjecting to the first and/or the second readout process, the storage phosphor can have an electric conductivity which is higher than outside the subjecting.

As the trap centers represent an independent optical system, compared to the light centers, the associated charge carrier states are basically independent of each other. The excitation spectrum of the charge carriers stored in trap centers (i.e. the readout spectrum) is not established by the excitation spectrum or emission spectrum of the light centers. Likewise, the excitation spectrum or emission spectrum of the light centers is not established by the readout spectrum of the trap centers. In this respect, optically stimulated luminescence is differentiated also from the usual upconversion induced by simultaneous multiphotone processes or anti-Stokes phenomena.

Analogous to the charging spectrum which gives information about properties of the light centers, the readout spectrum can be measured to characterise properties of the trap centers. For measuring the readout spectrum, the partially charged OSL substance is irradiated with light (readout process) and the emitted light is measured in an established wavelength region, the wavelength of the irradiated light being changed. In this way, for the charged OSL substance, the dependence of the optically stimulated luminescence on the wavelength of the reading-out light is obtained. One can proceed accordingly for the measuring of the charging spectrum, whereby for this purpose the OSL substance should preferably be not completely charged.

Here, an OSL substance is referred to as partially charged when at least so many charge carriers are stored at the trap centers that upon irradiation with a readout process there results a measurable luminescence signal. Here, the number of stored charge carriers represents preferably a macroscopically continuous variable.

The readout spectrum can have significant band structures. Even if the readout spectrum shows bands, preferably it does not correspond to a single-molecule spectrum. Hence it cannot be inferred from the spectrum, whether a concrete trap center is filled or empty. In this sense, a storage phosphor does not behave like a discrete storage.

In analogy to the readout spectrum, the charging spectrum describes the spectral distribution of the efficiency of charging operations.

Measuring Apparatus

The measurement for the proof of authenticity is carried out with a measuring apparatus coordinated with the optical storage phosphor used. The proof of authenticity utilizes the measuring signal's dependence on the previous history, i.e. the memory of the optical storage phosphor. Preferably, for this purpose, the value document is irradiated with light and the resulting luminescence is measured.

In a first embodiment, at least one light source is employed for illuminating, the wavelength of the light source, namely the centroid wavelength being suitable for reading out the optical storage phosphor. The wavelength region of 360 nm to 1200 nm, particularly preferably the wavelength region of 550 nm to 1000 nm is preferred here. In a further preferred manifestation, a differentiation is made between a first, a second and a third wavelength region, from which the at least one light source is preferably selected. The first wavelength region extends from 360 nm to 550 nm, preferably from 360 nm to 405 nm, the second wavelength region from 550 nm to 1000 nm, preferably from 600 nm to 750 nm, and the third wavelength region from 750 to 1200 nm, preferably from 750 nm to 1000 nm. In a particularly preferred configuration, the second wavelength region is 620-660 nm and the third wavelength region 750-1000 nm.

In a preferred embodiment, additionally at least a second light source is employed, which emits at the same wavelength.

In another preferred embodiment, additionally at least a second light source is employed, which emits at a wavelength which differs from the emission wavelength of the first light source. Preferably, the first and second light sources are configured such that the first readout process of the first light source and the second readout process of the second light source have at least two spectrally separate readout wavelengths.

Further preferably, the wavelength of the second light source deviates significantly from the first light source and is suitable for reading out the optical storage phosphor. A significant difference in the wavelength is achieved, when the wavelengths differ by more than half a full width at half maximum (HWHM) of the addressed band of the readout spectrum, or by them addressing distinguishable structures of the readout spectrum, as for example different bands or a minimum and a maximum in the readout spectrum.

In a particularly preferred manifestation, the two readout wavelengths are selected from two different ones of the above-mentioned wavelength regions.

In another preferred embodiment, a third light source is employed whose wavelength is in the region of 240 nm to 550 nm, preferably in the region of 350 nm to 550 nm, particularly preferably in the region of 380 nm to 550 nm. In one manifestation, the light of the light source in this wavelength region is suitable for charging the optical storage phosphor, in another manifestation the light of this light source is suitable for reading out the optical storage phosphor. Here, the third light source can be employed for emitting the charging pulse as well as for emitting the readout pulse.

In an alternative embodiment, the apparatus has a third light source which is suitable to subject the authenticity feature to a preparation step in the region of the optical storage phosphor. This can be suitable, for example, for effecting a partial charging of the storage phosphor in order to prepare for example desired signal levels in subsequent readout processes.

The mentioned light sources can be operated preferably in pulsed fashion, here nominal repetition frequencies are in the region of 0.1 kHz to 50 MHz. In addition, the light sources can be controlled in their intensity, luminous period and time course.

For establishing the pulse duration of the charging pulses, the checking method of the OSL substance and/or the OSL substance itself exert an influence. In a first preferred manifestation, for example, for checking a moved OSL substance with short luminescence lifetime, the pulse duration of the charging pulses is between 1 µs and 100 ms, preferably between 10 µs and 1 ms, particularly preferably between 10 µs and 100 µs. In a further preferred manifestation, for example for checking a stationary OSL substance and/or an OSL substance with long luminescence lifetime, the pulse duration of the readout pulses is between 1 µs and 100 ms, preferably between 500 µs and 50 ms, particularly preferably between 1 ms and 20 ms.

For establishing the pulse duration of the readout pulses, the checking method of the OSL substance and/or the OSL substance itself exert an influence. In a first preferred manifestation, for example for checking a moved OSL substance with short luminescence lifetime, the pulse duration of the readout pulses are between 1 µs and 100 ms, preferably between 1 µs and 100 µs, particularly preferably between 5 µs and 50 µs. In a further preferred manifestation, for example for checking a stationary OSL substance and/or an OSL substance with long luminescence lifetime, the pulse duration of the readout pulses is between 1 µs and 100 ms, preferably between 20 µs and 5 ms, particularly preferably between 40 µs and 1 ms. The readout pulse is preferably shorter than the charging pulse.

By a suitable selection of the pulse duration of the charging pulses and readout pulses, a check of stationary and/or moved OSL substances is thus possible in a suitable manner.

In one embodiment, the light pulses are radiated on approximately the same place on the value document and the light emission is measured in the mentioned suitable spectral region and recorded as a time series.

In a development of the invention, the measurement of the luminescence emission of the optical storage phosphor is effected with at least one photodetector in a suitable spectral region which comprises at least a part of the emission spectrum of the optical storage phosphor. This region is designated as a spectral detection window.

In a first embodiment, the detection has a temporal resolution which is suitable for resolving the readout curve adapted to the authenticity feature, in particular for measuring, in pulse operation, the emission as an effect of one single pulse, and in particular for having a temporal resolution of <20 µs, preferably <5 µs, more preferably of <1 µs in pulse operation.

In another embodiment, the detector has one single channel, the light from the entire spectral detection window being accumulated.

In another preferred embodiment, the detector has at least one second channel whose spectral detection window differs at least in one spectral region from the detection window of the first channel.

In a preferred embodiment, the apparatus has a detection device which is adapted for capturing a second spectral region which differs from the first spectral region. Preferably, the detection device makes possible a multi-channel detection with more than two or three channels which comprise particularly preferably several spectral regions.

The measuring apparatus can be disposed such that it evaluates the value document at one place.

Preferably, the measuring apparatus is disposed such that the value document is led past, for example linearly, the measuring apparatus and thus a whole measuring track is captured. It is particularly preferred that the value document is led past at least two measuring apparatuses mutually spatially shifted in another direction than the moving direction, so that at least two measuring tracks are captured.

Further in particular, the apparatus is connected with a background system for matching readout measurement value time series with reference readout measurement value time series. Preferably, the background system has a computing unit, for example a computer or an EDP (electronic data processing) system for the evaluation of the readout measurement value time series. In a preferred embodiment, the background system additionally has a data storage or a cloud storage which are suitable for storing the reference library with the corresponding readout measurement value time series, the corresponding look-up tables and the corresponding measuring parameters in order to make these available for an authenticity check.

Particularly preferably, the background system has an EDP system which is suitable for evaluating the readout measurement value time series and for matching it with reference time series from a stored reference library. By matching, for example, the readout curve with known readout curves of selected optical storage phosphors, the authenticity check of the examined optical storage phosphor is effected.

In particular, the background system can be part of a bank note processing machine or be connected with a bank note processing machine.

Pre-Configuration Step (Preparation Step)/Charging

In a first main aspect of the invention, it is merely demanded that the storage is in a readable state from the start or has been charged before, but not compulsorily completely, or has been brought into a different, more exactly defined state (e.g. saturation, minimum of stored charge carriers). Technically, a defined state would hardly be achievable without preceding measurement, because the storage phosphor may perhaps also undergo charging or unloading influences, such as for example reading-out influences, outside the measurement. The defined state ((pre-)configuration, can also be referred to as preparation, where applicable) can be achieved, for example, by means of charging the storage phosphor, or the storage phosphor can be set accordingly. These influences and the effect thereof are not necessarily known at the beginning of the proof of authenticity according to the present invention.

Hence, the charging of the optical storage phosphor can thus be effected independently of a subsequent charging sequence and/or query sequence.

In a first manifestation, the optical storage phosphor is not charged in targeted fashion for the authenticity evaluation within the measuring apparatus, but it is exploited that the optical storage phosphor has been submitted to charging influences (for example a previously carried out measurement with a different X-ray, UV or VIS sensor) also outside the measurement.

In another manifestation, the optical storage phosphor can be charged unspecifically or universally with light for the authenticity evaluation. For this, e.g. a broadband-emitting light source (flashbulb) can be employed.

For charging the OSL substance, for example light of a wavelength between 240 nm and 550 nm can be used. In particular, the optical storage phosphor can be charged with light of a wavelength greater than 250 nm and particularly with visible light (wavelength greater than 400 nm). In one configuration, light is used in a first wavelength region of 275 nm to 285 nm or a second wavelength region of 350 nm to 550 nm, particularly preferably in a first wavelength region of 385 nm to 405 nm or in a second wavelength region of 440-460 nm, and in particular at a wavelength of 450 nm.

In a particularly preferred manifestation, the optical storage phosphor can be charged with a pulsed light beam and particularly preferably with a pulsed light beam with a pulse duration of less than 0.1 seconds.

These light pulses are radiated by the above-mentioned light sources onto approximately the same place on the value document and the light emission in the mentioned suitable spectral region is measured and recorded as a readout measurement value time series.

In a second main aspect of the invention, a specific charging of the memory is assumed. This variant of the invention is described in detail further below.

In one development, the method even has the following step, before subjecting the optical storage phosphor to at least one charging sequence and/or query sequence: exciting the optical storage phosphor with at least one additional preparation step. This serves for setting a particular initial state. However, it is particularly preferred for the present invention that the method is effected without prior additional preparation of a defined initial state of the optical storage phosphor.

For the authenticity check, into the authenticity feature, which has already stored therein an uncertain, but non-negligible amount of charge carriers, there is impressed a measuring history by the application of specific (preferably periodic or also aperiodic) excitation sequences of excitation pulse(s) and/or continuously modulated excitation.

Query or Charging Sequences

The mentioned query or charging sequences consist preferably of single light pulses which are respectively established via intensity, wavelength and temporal pulse course (pulse form, pulse duration and pulse distance).

Within one succession of several pulses, a pulse can be characterized by its period duration, i.e. the duration from the first increase of the intensity until the end of the following dead-time interval.

The wavelength of a charging pulse or readout pulse is a characteristic measure of the spectrum of the light of this pulse and, for example, given by the median or by the position of the maximum of the spectral distribution of this pulse.

The intensity of a charging pulse or readout pulse is a characteristic measure of the number of photons which from this pulse impinge on the specimen at the measuring place. It can be defined, for example, as an associated signal strength at a suitable detector.

Pulse form of a charging pulse or readout pulse means the form of the temporal intensity course of this pulse. It can represent, for example, a rectangle form, sawtooth form, cosine form, gauss form, impulse form or also a different form.

Pulse duration of a charging pulse or readout pulse means a characteristic measure for the time during which the light of this pulse impinges on the measuring place. It can be described, for example, by the temporal full width at half maximum or the temporal distance of the turning points of the leading and the trailing edge of the pulse.

The pulse distance between one pulse and its successor describes the duration between the end of the one and the beginning of the subsequent pulse, for example defined by the duration between falling edge of the first and rising edge of the second, subsequent pulse. With this kind of definition, an overlapping of consecutive pulses can be described by a negative pulse distance.

A differentiation or variation of the pulse distance is only possible when there are at least three pulses.

FIG. 1 shows a charging or query sequence of three pulses P1, P2, and P3, three pulse forms being represented exemplarily, rectangle form, impulse form and modified sawtooth form.

First Main Aspect: Subjecting to at Least One Query Sequence

Optical Storage Phosphors as Memory-Type Substance Systems

At a particular point in time, in the trap centers of the optical storage phosphor there is present an charge carrier distribution which is compatible with external influences. "Compatible with external influences" means that a readout or charging process influences the charge carrier distribution or that the charge carrier distribution is influenced by the ambient temperature and/or further influences, such as mechanical pressure, electrical fields and/or radiation, including particle radiation. If the optical storage phosphor now is read out with a readout process, a part of the charge carriers leaves the trap centers and the charge carrier distribution in the trap centers adjusts itself accordingly, so that a further light pulse acts on a changed charge carrier distribution.

The charge carriers excited from the trap centers can transition, in particular on account of the readout process, to the light centers and trigger the emission of luminescence radiation there. Besides this desired process, however, charge carriers can also be trapped in (other) trap centers and/or relax non-radiantly. These paths do not contribute to the luminescence emission, however, but are relevant for the charge carrier distribution in the trap centers.

It is in particular preferred that the charge carrier distribution within the storage phosphor is changed on account of the first readout process in such a way that the second readout process has a different effect than the first readout process. By the changed charge carrier distribution there can be changed, for example, the probability of a transition (according to the quantum-mechanical transition matrix or the absorption cross-section) from the trap centers to the light centers. For a uniform transition rate, it can therefore be required, for example, that the second readout process has a changed intensity, a changed pulse form, a changed pulse width and/or a changed spectral form for achieving the same measurement value as upon the first readout process.

Preferably, it is possible that the first readout measurement value differs from the second readout measurement value, when the first readout process is equal to the second readout process. Alternatively or additionally, it is possible that the first readout measurement value is equal to the second readout measurement value, when the first readout process and the second readout process are different.

Of practical importance is, above all, that the number of emitted OSL photons (i.e., the intensity of the emission) depends on the number of stored charge carriers, the number of irradiated readout photons (determined by the duration and intensity) and substance-specific properties (for example, readout spectrum, charge diffusion in the conduction band, parasitic processes in the OSL substance).

If one reads out a charged optical storage phosphor and records the emitted intensity over time, the readout curve will result. If intensity and wavelength of the reading-out light beam are kept constant here, the associated readout curve for an optical storage phosphor showing no significant afterglow goes down approximately exponentially in the course of time, the associated time constant depending directly on the readout intensity and substance-specific quantities. This applies in particular when the duration of the readout exceeds the intrinsic lifetime of the luminescence of the light center, which is given by the lifetime of its excited electronic state.

If an optical storage phosphor shows afterglow, the afterglow is superimposed on the optically stimulated luminescence and the intensity in the readout curve may first even rise.

Therefore, the shape of the readout curve of every single process depends on the number of stored charge carriers, the intensity and duration of the reading-out light as well as on substance-specific properties.

If preferably a first light pulse of a particular wavelength reads out the optical storage phosphor during its pulse duration with the associated intensity, the stored charge carriers are reduced accordingly and a part of these charge carriers generates the emitting luminescence in the light centers upon relaxation. The subsequent pulse of the measurement sequence thus reads out the optical storage phosphor in which already less stored charge carriers are present.

If one views a process pair of a first and a subsequent process, the measurement result which is achieved by the subsequent process therefore depends on the previous history which was impressed by the first process. Preferably, the process pair is a pulse pair. In the pulse pair, the light pulses can have the same or different properties.

When the subsequent pulse has the same properties as the first pulse, the emitted luminescence is lower (because of the reduced number of stored charge carriers in comparison to the first pulse). A measurement sequence of a succession of equal single pulses leads in the measuring signal to a readout curve in which the envelope nearly exponentially falls (under the conditions that the substance-intrinsic lifetime and possible afterglow are short compared to the pulse duration). HoV/fast the envelope of the readout curve falls during this measurement sequence is substance-specific.

However, the subsequent pulse may differ in its properties from the first pulse, the measured luminescence intensity in the subsequent pulse being respectively greater, equal or smaller than that in the first pulse:
1. The wavelength is different. Such a pulse addresses a different place of the readout spectrum with different readout efficiencies and thus checks substance-specific properties. The readout curve of a measurement sequence utilizing pulses of different wavelengths in general deviates clearly from the readout curve of a measurement sequence of equal pulses.
2 The intensity of the subsequent pulse differs from that of the first pulse, which is why the luminescence intensity caused by the subsequent pulse in general differs from that of the first pulse. A measurement sequence of pulses having different intensity in general deviates clearly from the readout curve of a measurement sequence of equal pulses.
3. The duration of the subsequent pulse differs from that of the first pulse, which is why the temporal distribution of the luminescence during the subsequent pulse differs from the temporal distribution of the luminescence during the first pulse. A measurement sequence of pulses having different duration in general deviates clearly from the readout curve of a measurement sequence of equal pulses.
4. The pulse form of the subsequent pulse differs from that of the first pulse. This is an effective parameter in particular when the time course of the single readout pulses is asymmetric (for example, rising against falling intensity).
5. The first and the subsequent pulse differ in several properties, in particular in wavelength and intensity. Here, the measured luminescence intensity in the subsequent pulse can be greater, equal or smaller than that of the first pulse.

In special embodiments, different readout processes, preferably different readout pulses can be used,
which for the special feature of the OSL substance show a known and mutually related effect on the luminescence signal, and/or
which have a coordinated effect on the special feature of a relevant OSL substance, so that in the time series of the luminescence signal there arises a characteristic signature, and/or
which in particular for the special feature of a special OSL substance have a consequence, exchangeable in its order, for the luminescence signal.

When selecting the readout process, preferably readout pulses, different targets can be pursued:

The wavelengths of the readout pulse can be coordinated with the readout spectrum of the optical storage phosphor such that optimum readout speed or signal intensity can be obtained. There can also be selected wavelengths in targeted fashion, which do not generate any readout signal or cause only a classical luminescence without significant interaction with the storage system. This is relevant in particular when not only one single authenticity feature but a whole set of different authenticity features is employed for coding. The authenticity evaluation is adapted accordingly.

Suitable Query Sequence

For generating suitable query sequences, orders of readout processes, preferably readout pulses, are selected, which enable a specific check of characteristic memory properties of the optical storage phosphor. This is effected by a suitable evaluation of the readout curve respectively generated by the measurement sequence, individually for each detection channel or together for two or several detection channels. In addition, the measurement data can be evaluated with respect to further substance properties, for example properties of the excitation spectra or emission spectra, the luminescence lifetime or luminescence intensities.

The variations of the query sequences have the advantage of a more exact determination of the substance-specific temporal dynamics and thus they make it more difficult to forge the authenticity feature.

In a first embodiment, the query sequence is composed of at least one readout process and no exciting of the optical storage phosphor with at least one preparation step is carried out.

In another embodiment, subjecting the optical storage phosphor to at least one query sequence is effected without prior preparation of a defined initial state of the optical storage phosphor.

In a second embodiment, the query sequence comprises at least one readout process which comprises at least one continuous readout intensity-modulated over time.

In a preferred embodiment, the query sequence comprises at least one readout process which comprises at least one readout pulse.

Particularly preferably, a readout process comprises at least two, more preferably three to sixteen readout pulses.

In a third preferred manifestation, the method comprises two query sequences which respectively comprise at least a first readout process and a second readout process, particularly preferably three to five query sequences.

In another preferred embodiment, the query sequences are carried out successively or in parallel or temporally overlapping. Preferably, the query sequences comprise at least one pulse, more preferably three to sixteen pulses.

In a fourth preferred embodiment, several query sequences are carried out in a different order. Preferably, the query sequences are effected one after the other or at the same time or temporally overlapping.

Particularly preferably, the second query sequence is effected after the first query sequence or the query sequences are carried out in the order one, two, three.

In another preferred embodiment, the second readout process is effected in temporal order after the first readout process.

Particularly preferably, each readout process comprises at least two readout pulses, particularly preferably the first pulse is effected in temporal order before the second pulse. This leads to different stimulations.

In an alternative preferred embodiment, the query sequences comprise a third and fourth readout process.

Particularly preferably, the third readout process is effected in temporal order after the first readout process and the fourth readout process in temporal order after the second readout process, the readout processes preferably comprising at least one pulse, more preferably three to eight pulses.

In a fifth preferred embodiment, the query sequences are carried out at different wavelengths of the readout processes and/or detection of the optical emission, the readout processes preferably comprising at least one pulse, more preferably three to eight pulses.

In a preferred manifestation, there are effected query sequences in which at least a first readout process and a second readout process differ in at least the spectral form, i.e. in the spectral application of the light of the readout process or charging process, the readout processes preferably comprising at least one pulse, more preferably three to eight pulses.

In an alternative preferred manifestation, there are effected query sequences in which at least a first readout process and a second readout process have at least two spectrally separate readout wavelengths, the readout processes preferably comprising at least one pulse, more preferably three to eight pulses.

In a sixth preferred embodiment, several query sequences differing in their local application are carried out.

In a seventh preferred embodiment, several query sequences are carried out, at least a first readout process and a second readout process differing in the intensity, in the pulse form and/or in the pulse distance of the readout process, the readout processes preferably comprising at least one pulse, more preferably three to eight pulses.

Particularly preferably, query sequences are composed of more than two single readout pulses, preferably more than five single pulses, the single pulses preferably respectively having a pulse duration of less than 1 ms, preferably less than 0.1 ms and particularly preferably less than 20 µs.

In a first manifestation, the query sequence is composed of equal readout pulses. The readout pulse which is established via wavelength, intensity and time course (pulse duration and pulse distance duration or pulse duration and repetition frequency) for this purpose is repeatedly executed several times one after the other.

In a second preferred manifestation, the query sequence is composed of at least two different readout pulses which are respectively executed in an established order and repeated. The at least two readout pulses are respectively established via the parameter wavelength, intensity, pulse duration and pulse distance duration and the at least two pulses differ in at least one of these parameters.

In another manifestation, the order of the readout pulse is determined by chance.

In another manifestation, the order of the pulses is arbitrarily firmly specified.

In a preferred manifestation, the at least two pulses repeatedly alternate in the query sequence.

In another preferred manifestation, each readout pulse in the query sequence is respectively carried out at least twice, before a change over to a different pulse is effected.

In another preferred manifestation, the query sequence is composed of at least two groups with respectively at least two executions of one of the at least two readout pulses, consecutive groups consisting of different readout pulses.

In a particularly preferred manifestation, the query sequence is composed of at least two different readout pulses which respectively differ at least in their wavelengths, which additionally are respectively mutually coordinated in their intensities and pulse durations such that with respect to their effect on the selected optical storage phosphor they are exchangeable within the scope of the measuring accuracy.

Preferably, the at least two wavelengths are selected such that the first wavelength is near the maximum of a band of the readout spectrum and at least one second wavelength is shifted compared with the first wavelength by at least a full width at half maximum of this band.

It is particularly preferred that the wavelength of the first and at least one second readout pulse address different bands of the readout spectrum. For the selected optical storage phosphor as an authenticity feature, the two readout pulses in the query sequence are exchanged, which is used for the authenticity check. In a first manifestation, the query sequence is built up, under these conditions, from an alternating succession of the two readout pulses.

In a second manifestation, the query sequence is composed of at least two groups with respectively at least two executions of one of the two readout pulses, consecutive groups consisting of different readout pulses.

In a third manifestation, the order of the readout pulses in the query sequence is established arbitrarily.

In another manifestation, the query sequence is composed of at least two different readout pulses which differ in at least one of the parameters wavelength, intensity and pulse duration, the first of the at least two readout pulses being repeated m times with a first frequency and the at least second one of the two readout pulses n times with a second frequency differing from the first one, n and m being integers greater than three.

In a preferred manifestation, the at least two readout pulses overlap in none of the repetitions, in an alternative manifestation the at least two pulses overlap at least partially in at least a part of the repetitions within the query sequence.

In another manifestation, the query sequence is composed of at least two different readout pulses which differ at least in their pulse duration. Here, it is preferred that the pulse duration of the first readout pulse is at least twice the length of that of the at least second pulse, and it is particularly preferred that the pulse duration of the first readout pulse is at least ten times the length of that of the at least second pulse.

In one manifestation, the first readout pulse alternates with at least one group of at least five repetitions of a further one of the at least two readout pulses, whereby the long single pulse or the pulse group may begin. Preferably, in doing so, the pulse duration of the first pulse is adapted to the sum of the pulse durations of the readout pulses of the following group of at least five repetitions of a further one of the at least two readout pulses.

In another manifestation, the first readout pulses and the at least second readout pulses overlap at least partially in at least a part of the repetitions within the query sequence.

In another manifestation, the query sequence comprises at least a third or a fourth readout process, preferably four or more readout pulses, particularly preferably at least eight or at least ten.

In an alternative manifestation, the query sequence comprises a third readout pulse which is effected in temporal order after the first readout pulse and a fourth readout pulse in temporal order after the second readout pulse, preferably the readout pulses are respectively repeatedly executed in an established order, particularly preferably an at least twofold repetition of the respectively two readout pulse groups is executed.

In a further alternative manifestation, via the first, second, third readout measurement value and/or fourth readout measurement value there is captured an emission spectrum, an intensity, a wavelength and/or a decay time of the emission of the storage phosphor.

Suitable Readout Spectra

In a first embodiment, the readout spectrum of the selected optical storage phosphor is structured, it includes preferably at least one band whose maximum is in the region of 400 nm to 2000 nm, and particularly preferably this at least one band has on its more flat edge a half width at half maximum (determined as HWHM) of at most 250 nm.

In another preferred embodiment, the readout spectrum of the selected optical storage phosphor has more than one band in the region of 400 nm to 2000 nm, it being particularly preferred that the full widths at half maximum of the bands (determined as FWHM) are at most 500 nm.

In a development of the invention, the emission spectrum of the optical storage phosphor is in the region of 300 nm to 2000 nm.

In a preferred embodiment, the emission spectrum of the storage phosphor does not coincide completely with the readout spectrum of the storage phosphor.

Second Main Aspect: Subjecting to at Least One Charging Sequence

For universally charging various members of a feature series, a broadband-emitting light source (flashbulb) can be employed. The charging efficiency of a substance with regard to a broadband illumination typically differs from the efficiency of a narrow-band illumination (for example by a laser line). A broadband illumination can compensate spectral shifts which are caused by the substance design or the substance selection. Thus, substances can be treated as equal in a broadband excitation which under narrow-band illuminations are separable (for example, because for one substance a specific transition was made).

The charging spectrum describes the spectral distribution of the efficiency of charging operations. The storage efficiency here varies with the wavelength. The charging spectrum normally is in the high-energetic part of the excitation spectrum of the photoluminescence. Here, the charging spectrum and excitation spectrum can have different courses (Liu, Sci. Rep. 3, 1554; DOI:10.1038/srep01554 (2013)).

In particular, there is typically a border wavelength, from which a substance is no longer charged significantly, but is substantially excited to photoluminescence. If one selects, for example, two charging processes such that an illumination process effects an efficient charging at the first wavelength, while at the second wavelength the OSL system is not involved, this can be used in a measurement sequence for the authenticity check: analogous to the connection of readout efficiency and readout curve, the spectral charging efficiency can be checked in this way with the help of the charging curve or a complex readout curve with the help of the effect of the different charging processes. If one selects the parameters of two charging processes such that they unfold the same effect only for a specific substance, the resultant commutativity of the charging processes which is specific to this substance can be used for the authenticity evaluation.

In a preferred embodiment, the optical storage phosphor with at least one charging sequence and/or at least one preparation step a threshold emission is set. The threshold emission can be adapted by setting the charging sequence or charge amount. At the threshold emission, the emission of the OSL substance preferably shows a defined output signal, in particular a defined intensity of the optical emission in a defined readout process. This achieves prepared defined initial states of the OSL substances, so that these can be compared with each other and thus can be differentiated.

Two substances can be separated also on the basis of different charging speeds. In one manifestation, for this purpose there are employed charging sequences including several charging processes, preferably several charging pulses. From the associated selection signals the charging speed of the optical storage phosphor is determined. The selection signals correspond to the emission time series or emission row time series or the readout measurement value time series.

In a first embodiment, step a) comprises two charging sequences which respectively comprise at least one first charging process and a second charging process.

In another preferred embodiment, the charging sequences are carried out successively or in parallel or temporally overlapping. Preferably, the charging sequences comprise at least one pulse, more preferably three to eight pulses.

In another embodiment, a charging sequence comprises at least one first charging process and a second charging process which is effected temporally after the first readout process.

In an alternative embodiment, a charging sequence comprises at least a third or a fourth charging process, preferably at least four to twenty, particularly preferably eight to sixteen.

In a second embodiment, a charging sequence comprises at least one charging process which differs from another charging process in the wavelength, in the intensity, in the pulse duration, in the pulse interval duration and/or in the wavelength.

In a preferred embodiment, a charging process comprises at least a continuous charging intensity-modulated over time. This results in temporal fluctuations in the intensity of the charging excitation, i.e. there is effected a non-discrete charging.

In another preferred embodiment, a charging process comprises at least one charging pulse, particularly preferably two or more charging pulses, more preferably three to eight or four to twenty.

In another manifestation, different pulse durations of the charging pulse are exploited to estimate how fast a feature is charged under the given illumination conditions.

In the measurements of all these manifestations the signal which comes up with the charging pulse can be used directly. Moreover, a readout pulse or several and also different readout pulses can be employed as a sample process to check the efficiency of the charging.

FIG. 2 shows different charging speeds of three substances (substance I, substance II, substance III). The growth of the signal under readout pulses (short pulses) is viewed, when the substance is charged repeatedly (longer pulses). In the associated sequence, at first a readout pulse generates a signal, then a charging pulse follows.

This pulse pair is repeated ten times, the readout pulse measuring the effect of the previously running charging pulse. From the maxima of the readout pulses there thus results an evaluateable curve for the charging speed of these substances. Here, one recognizes significant differences in the effect of the charging pulses on the substances I, II or III: While the charging pulses show no significant effect on substance I, a significant increase of the intensity of the optical emission is observed for substance II in response to the respectively associated readout process. With a suitable quantitative evaluation the substances II and III can also be differentiated from each other with the help of their charging behaviour.

Third Main Aspect: Subjecting to Query and Charging Sequences

By mixing charging sequences and query sequences more complex readout curves can be obtained. This has the advantage of an increased security, because this mixing of charging sequences and query sequences is difficult to imitate.

In order to cancel additional external influences, by a suitable charging sequence an optical storage phosphor can be brought into a situation in which these influences hardly play a role.

In a preferred embodiment, for this purpose a suitable succession of readout pulse and charging pulse is employed, until with the help of a signal, for example under a readout pulse, it is ascertained that a threshold was exceeded. This allows defined output signals to be set. This achieves a comparability of the optical storage phosphors.

In another preferred embodiment, a so-called thermalizing sequence of several charging and query sequences (for example, also randomized) can be employed to destroy the coherence of the memory, so that with a further check it is no longer identifiable which measurement sequence the special feature was subjected to before this thermalizing sequence.

Here, typically, a partially emptied OSL substance is present, in contrast to specifically prepared or even singular situations.

In a preferred embodiment, the method comprises a further step h., in which the optical storage phosphor is subjected to at least one thermalizing sequence.

In a first embodiment, the optical storage phosphor is subjected to several query sequences and to several charging sequences.

In a preferred embodiment, a repeated and/or respectively alternating succession of the at least one charging process and the at least one readout process is effected, particularly preferably the processes respectively comprise at least one pulse, i.e. first charging pulse, first readout pulse.

In another preferred embodiment, more than two successions are effected, the following order being particularly preferred: charging process/readout process/charging process/readout process, particularly preferably the processes respectively comprise at least one pulse.

In an alternative preferred embodiment, at least one 2-fold-randomized (accidental) repetition of the charging processes/readout processes is effected, particularly preferably the processes respectively comprise at least one pulse.

In another manifestation, in one sequence the combination of charging pulse and readout pulse under which the emission signal becomes stationary can be searched. This allows different charging speeds to be queried.

Evaluation and Proof of Authenticity

Depending on the employed charging or query sequence there results a readout measurement value time series which is evaluated for the proof of authenticity. Depending on how the selected optical storage phosphor behaves under a particular charging or query sequence and which properties should be addressed by this sequence for the proof of authenticity, different aspects of the readout measurement value time series must be evaluated. It is also possible that various authenticity features are subjected to several query sequences.

From a readout measurement value time series there can be created a readout curve. By determining the shape of the readout curve or by determining parameters, preferably regarding absolute intensity calibrations of scale-invariant parameters which describe the time course of the curve, and matching the course of the curve or the particular parameters with the results to be expected for known reference storage phosphors, the recognition of the authenticity of an optical storage phosphor is possible.

For known reference storage phosphors there are deposited reference readout measurement value time series or reference readout measurement value row time series in, for example, look-up tables. By matching the captured readout curve form or the captured parameters there is effected an allocation of the optical storage phosphors with the help of the look-up table. This allows optical storage phosphors to be differentiated and an evaluation of the authenticity of the optical storage phosphor to be effected.

Here, evaluation methods are particularly preferred, which do not need a defined initial state of the optical storage phosphor for the evaluation of the authenticity.

Proof of Authenticity:

a) Shape of the Readout Curve

For proof of authenticity, the shape of the readout curve can be evaluated directly by comparing it with a specification or an estimator.

b) Parameters which Describe the Temporal Course of the Curve

Parameters which are preferably evaluated are: the ratio of the signal intensities, in particular at the beginning and at the end of the pulse train, mean value of the signal intensities of selected pulses, in particular with alternating sequences, or the emptying ratio which is given by the difference of the signal intensity at the beginning and end of the sequence, in particular relative to the signal intensity at the beginning of the sequence. Further preferred parameters are the differences of directly consecutive readout measurement values or readout measurement values following each other in a larger temporal distance. Further preferred parameters are the relative differences of directly consecutive readout measurement values or readout measurement values following each other in a larger temporal distance.

Preferably, by the readout measurement value time series of at least two readout measurement values there is captured an intensity relation of the first readout measurement value to the second and/or, where applicable, following readout measurement value of the storage phosphor, in order to thus determine the readout speed of the optical storage phosphor. The intensity ratio can be formed at various times and used as a measure for the characteristic time behaviour of the luminescence.

With spectral multi-channel detection there can also be determined the intensity ratios of different emission bands and the respective temporal behaviour under the given measurement sequence.

Besides the entire readout curve, also each pulse can be viewed. The build-up or decay behaviour of a single pulse gives characteristic information about the time behaviour of the light center as well as possibly occurring afterglow.

FIG. 3 shows the normalized signal course under a pulse pair (first pulse "red" followed by pulse "NIR") together with exponential adaptation of the measuring signal to the part of the readout curve in which respectively the readout pulse is off and the signal has substantially decayed. From these data, the exponent of adaptation can be utilized as a further measure value.

Preferably, the decay time of the emission of a single pulse after a first readout process is so long that the emission caused by the first readout process is superimposed on the emission caused by the second readout process.

Alternatively preferably, the decay time of the emission of a single pulse after a first readout process is so short that the emission caused by the first readout process has already substantially decayed at the beginning of the second readout process.

Additionally, from the readout curve there can be also determined the intrinsic luminescence lifetime or the persistent luminescence (afterglow). In particular, in cases in which the luminescence lifetime (or the afterglow duration) is greater than the pulse distance the readout curve assumes unusual forms with, at first, cumulatively increasing intensities.

For the proof of authenticity, preferably from the parameters describing the time course of the curve, the ratio of the signal intensities, the mean value of the signal intensities or the emptying ratio, there is quantitatively determined a characteristic memory property.

For an authenticity feature, these properties respectively depend on the kind of the measurement. Due to the narrow interlacing of measuring procedure and characteristic quantity there results an increased security, because for a successful imitation, the feature composition and the employed measuring procedure (with temporal successions and parametrizations) must be known.

Examples of Characteristic Memory Properties are:

Readout speed (How fast are energy reserves emptied?) In the OSL substance, this quantity describes how fast a substance can be read out or how fast the stored energy reserves are emptied. It can be described as a relative decrease in the optically stimulated luminescence from readout pulse to readout pulse or as a derivation of the readout curve. If one compares the readout speed of two optical storage phosphors under the same measurement sequence, differences will arise from material properties of the optical storage phosphors, such as their stimulatability under these conditions, charge transport properties, or various probabilities for the stimulated charge carriers becoming trapped in (other) trap centers.

Charging speed (How fast is the charging effected?) In the OSL substance, this quantity describes how fast or effective a substance can be charged. It can be described as a relative increase in the optically stimulated luminescence from charging pulse to charging pulse or as a derivation of the charging curve. If one compares the charging speed of two optical storage phosphors under the same measurement sequence, differences will arise from material properties of the optical storage phosphors.

Memory depth (How long can an event in the previous history date back so that it can still significantly influence the result of a measurement?) This can be effected by repeatedly applying a measurement sequence which at certain times is replaced by another distinguished measuring event, for example by a strong readout pulse. In a preferred manifestation, the memory depth is small (2 cycles), so that the readout curve depends, as possible, only on the immediate previous history.

Exchangeability rules (Is information overwritten or changed by another information?) For the optical storage phosphor, the readout pulses are established such that they are distinguishable in a defined fashion in their effect or are preferably similar in a defined fashion. The distinguishability or similarity can be determined via a distinguishability measure (exchangeability measure). Such a measure describes how the readout curve changes when the order of two readout pulses is exchanged in the associated measurement sequence.

In one manifestation, the viewed pulse is compared with an estimated value, which arises from the neighbouring pulses by suitable methods (such as linear approximation or averaging).

In another manifestation, the viewed pulse is compared with an estimated value which arises from an additional measurement.

In an alternative manifestation, systems (storage phosphor, readout pulses and measurement sequences) with defined distinguishability are preferred, in another preferred manifestation, systems are preferred in which exchangeability is fulfilled.

Continuity of the memory (May gaps occur in an otherwise continuous memory?)

In an optical storage phosphor as an authenticity feature, this quantity describes whether in the case of a temporary interruption of an otherwise uniform measurement sequence a readout curve will arise which could be continuously composed from the two segments before and after the interruption. If the segments before and after the interruption can be continuously composed, the memory is designated as continuous under this measurement sequence. If in such a composition there occur steps in the readout curve, the memory under is designated as non-continuous this measurement sequence, also the kind and form of the step (signal too large or too small compared to the target, rising or increasingly falling) being characteristic. A possible continuity measure compares, directly after the interruption, the estimated continuation of the readout curve with the one actually measured under the given measurement sequence.

In a particularly preferred manifestation, optical storage phosphors, readout pulses and measurement sequence are selected such that the memory of the selected optical storage phosphor is substantially continuous under the selected readout pulses and measurement sequences.

Persistence (How stable is the memory over time? Does the remembrance extinguish?) In OSL substances the trap occupation changes over time ("fading"), because non-radiating relaxation paths are accessible also at ambient temperature.) As a possible measuring system, after a charging pulse the waiting period until the first pulse of the subsequent measurement sequence can be varied. From the comparison of the readout curves for different waiting periods there can be determined suitable measures of persistence, such as the intensity persistence (stability of the signal maximum of the readout curve compared with the waiting period) or speed persistence (stability of the readout speed compared with the waiting period).

In one manifestation, OSL substances and charging pulses are selected which guarantee a long persistence of the memory in order to temporally and spatially decouple charging and reading out.

In a second manifestation, authenticity feature and charging pulse are selected which guarantee a short persistence of the memory, in order to temporally and spatially couple charging and reading out and to thus make necessary a machine processing.

In a preferred embodiment, OSL substances and charging pulses are selected such that the persistence of the memory is adapted to the processing speed, i.e. that the persistence of the memory is set such that as from a waiting period of 50 µs, particularly preferably as from a waiting period of 20 s, after the charging the memory is stable for a fixed measurement sequence.

Sensitivity (How the memory varies with the parameters of a stimulus?) In an OSL substance the efficiency of the measurement changes with the wavelength, i.e. there is a readout or charging spectrum. Alternatively, also the dependence of the optically stimulated luminescence on the reading-out intensity can be measured.

In one manifestation, OSL substances are selected, which have a readout spectrum with at least one distinctive spectral structure which in the stimulation efficiency is configured varying with the wavelength, the readout spectrum having at least one local minimum in which the stimulation efficiency is reduced by at least 10% in comparison to the flanking maxima.

In a preferred manifestation, the stimulation efficiency is reduced by at least 30% in comparison to the flanking maxima, a local minimum meaning that the intensity starting out therefrom increases both towards larger and towards smaller wavelengths.

In a second manifestation, OSL substances are selected, which have a charging spectrum with at least one distinctive spectral structure which in the charging efficiency is configured varying with the wavelength, the readout spectrum having at least one local minimum in which the charging efficiency is reduced by at least 10% in comparison to the flanking maxima.

Association rules: Associativity describes how various measuring processes upon simultaneous or consecutive action influence the memory in comparison to the situation in which respectively only one of the measuring processes acts. For example, the light emission of an optical storage phosphor depends on whether two different reading-out measuring processes are executed one after the other or overlap in time.

Memory strength: The memory strength describes how strongly a measuring process influences a subsequent one. For a memory-type feature system, an efficiency $\eta$ can be defined, $S(P1)=\eta\ S(P1°P1)$, which can also be understood, where applicable, as a function of further parameters. For a memory-less system $\eta=1$. More complex measure values for the memory strength are conceivable by, for example, not comparing consecutive processes but processes further apart from each other. With n-fold repetition of P1 (designated as P1″) there thus results $S(P1)=\eta_n\ S(P1″)$ or with normalization $nS(P1)=\eta_n\ S(P1″)$. Instead of directly using measurement values of one measuring process, also measurement values of several measuring processes can be computed before (for example averaged). This can be expedient in particular when a distinguished measuring process sequence is to be employed.

Saturation behaviour: For describing to what extent the memory-type system is saturable, via suitable successions of measuring processes it is ascertained under which conditions the system loses its memory, because in a saturated state the system behaviour becomes path-independent. The saturation behaviour thus describes the way how the saturated state is reached and thus the memory cannot receive any more additional information.

Latency: The memory property of latency relates to the delay between the point in time when a measuring process acts and the point in time when the effect becomes visible in the measuring history. This is an important memory property in particular in such cases in which physical properties are changed via cascaded processes (for example in the case of luminescence by energy transfer from a sensitizer to the light center of a luminophore).

Isolation: The isolation describes the stability of the value of the memory property against the environment (for example a working temperature or applied electrical fields for an optically stimulateable feature system, or, where applicable, against chemical environment or coupling to a heat bath). Preferably, in the proof method the feature system is isolated against the environment and only influenceable by measuring processes.

Specificity: With specificity it is described how measuring processes of a type act in comparison to another type. In contrast to the sensitivity which describes the effectiveness of a measuring process upon varying parameters, specificity compares the effect of categorically different measuring processes. If, for example, a memory-type feature system is sensitive to optical and thermal stimuli (for example, a system which has both optically stimulated luminescence and thermoluminescence), specificity describes how the two measuring process types can be compared in their effects. For example, the measurement value changes under measuring processes of each type which are respectively repeated can be put in mutual relation. A normalization over the duration of the measuring processes, the number of measuring processes or the applied energy is helpful here.

Reference Library

The safeguarding system typically includes several optical storage phosphors for which respectively several charging or query sequences are deposited which are coordinated with one or also several different types of measuring apparatuses, so that the proof of authenticity can be adapted respectively and at the same time can be carried out specifically.

For a selected optical storage phosphor there can be defined a plurality of charging or query sequences for the proof of authenticity. This is in particular relevant when several different measuring apparatuses are employed which differ, for example, in the wavelengths of the employed light sources. It is also preferred that the results under a first charging or query sequence are used for the proof of authenticity under a second charging or query sequence which is different from the first one (as an estimator and/or reference, for example for evaluating exchangeabilities).

Moreover, charging or query sequences can be defined, under which a whole associated group of optical storage phosphors is recognized as authentic. If, for example, for a currency a group of optical storage phosphors is selected, each denomination containing a different optical storage phosphor, sequences can be defined which are used simultaneously for the authenticity check of all denominations and charging or query sequences can be defined specifically for one denomination.

This approach allows a hierarchical structuralization of the bank note evaluation from the quality assurance to the authenticity evaluation of one single issue of a denomination or special preparations.

In one preferred manifestation, a reference library comprises such sequences which can be used for the authenticity evaluation of a selected optical storage phosphor with a selected measuring apparatus.

In another preferred manifestation, the reference library comprises measurement parameters which are suitable for being employed in relevantly discriminating proofs of authenticity for various features belonging to an OSL substance.

For the authenticity evaluation of the selected authenticity feature on the selected measuring apparatus there is preferably used at least one charging or query sequence from this reference library.

For the authenticity evaluation of the selected authenticity feature on the selected measuring apparatus there are particularly preferably used more than one charging or query sequences from this reference library.

In an alternative manifestation, the reference library comprises look-up tables which are suitable for being employed in relevantly discriminating proofs of authenticity for various features belonging to an OSL substance.

BRIEF DESCRIPTION OF THE DRAWINGS

Value documents with at least one authenticity feature having an optical storage phosphor according to the invention are preferred.

Value documents which have several different authenticity features are particularly preferred. The method for checking the different authenticity features comprises several different query sequences and/or charging sequences.

Figures

Figure 1:
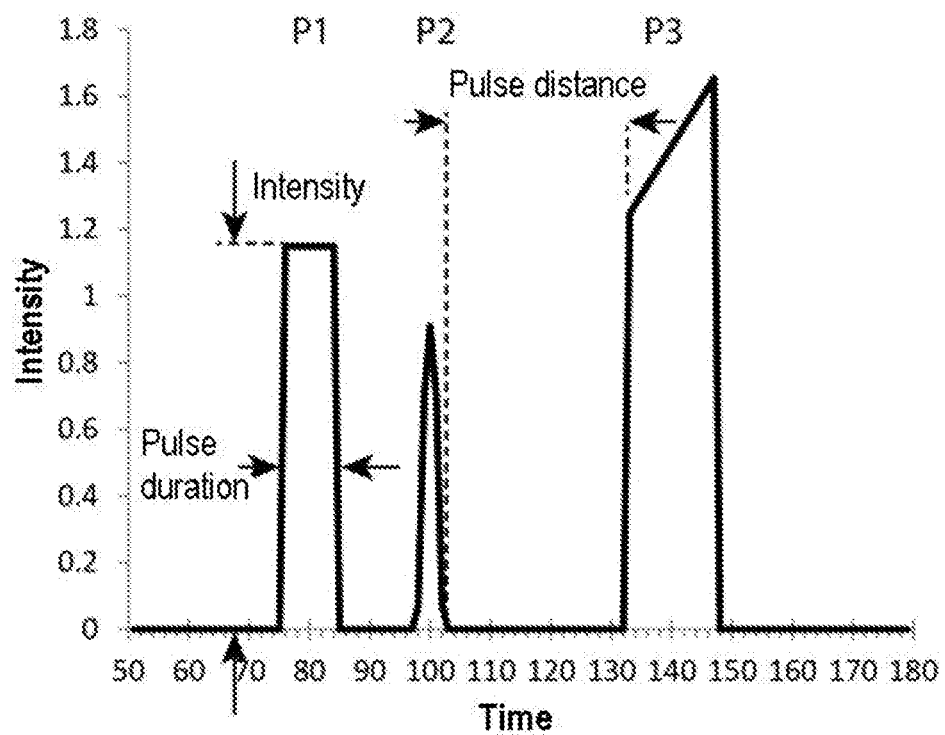
Figure 2:
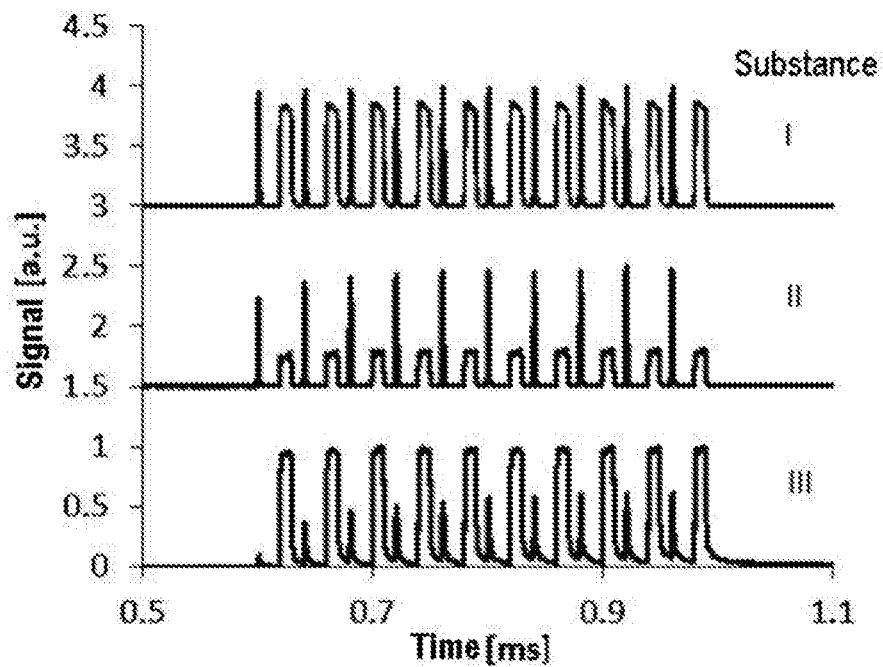
Figure 3:
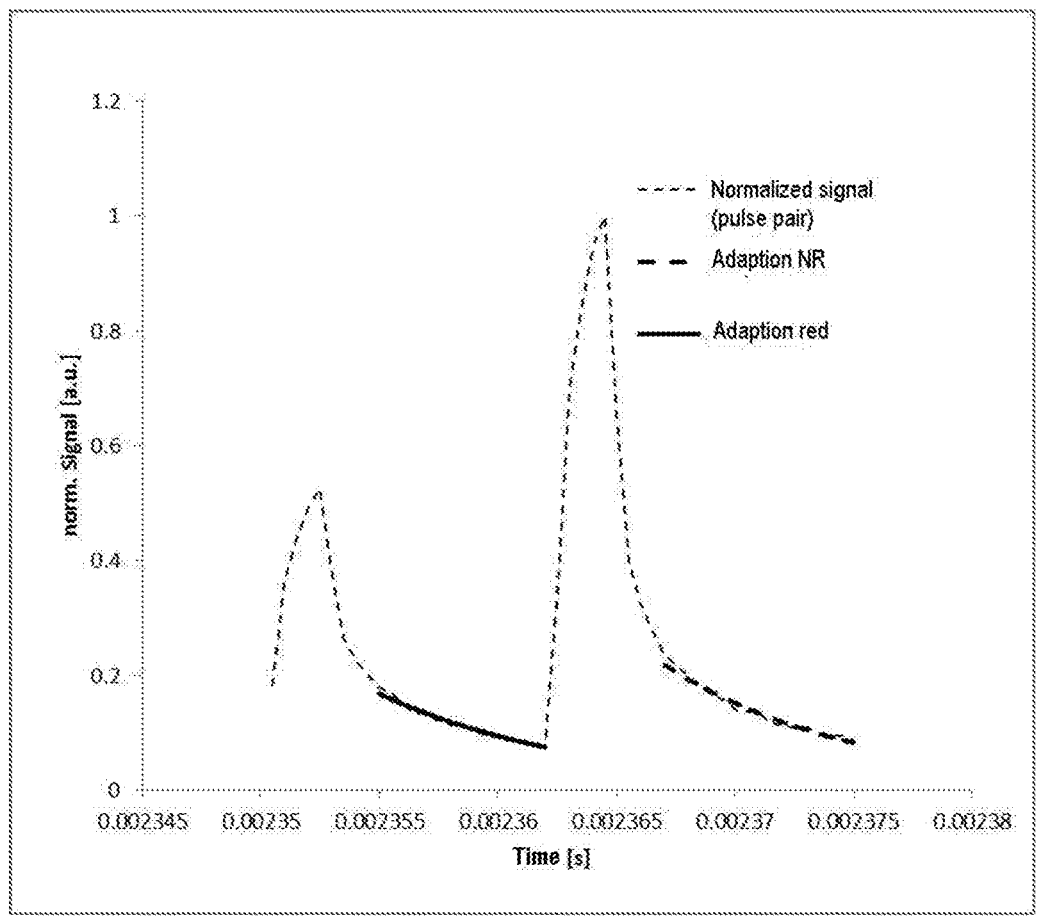
Figure 4:
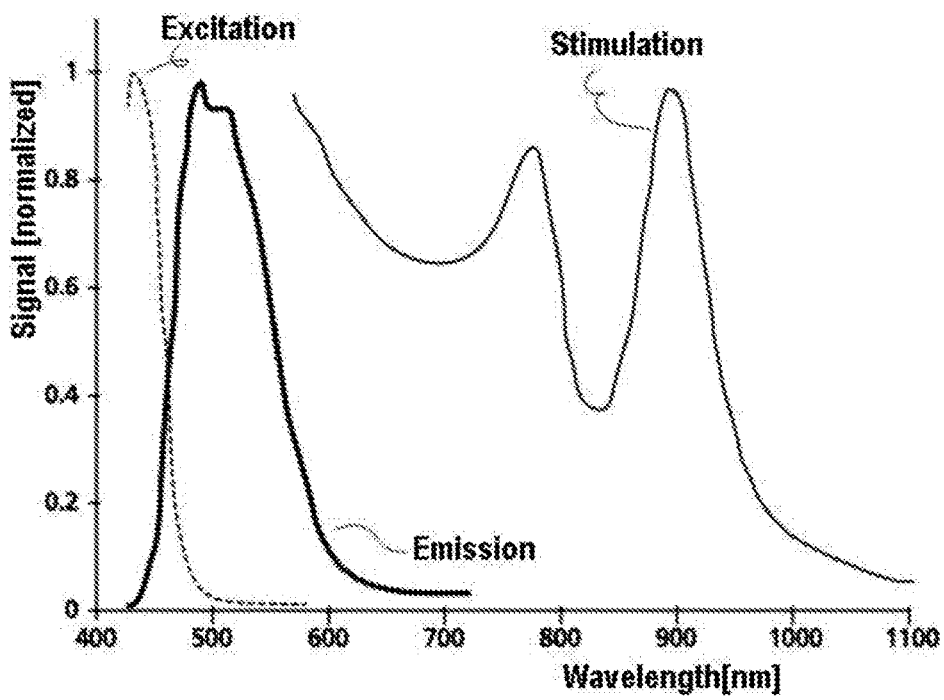
Figure 5:
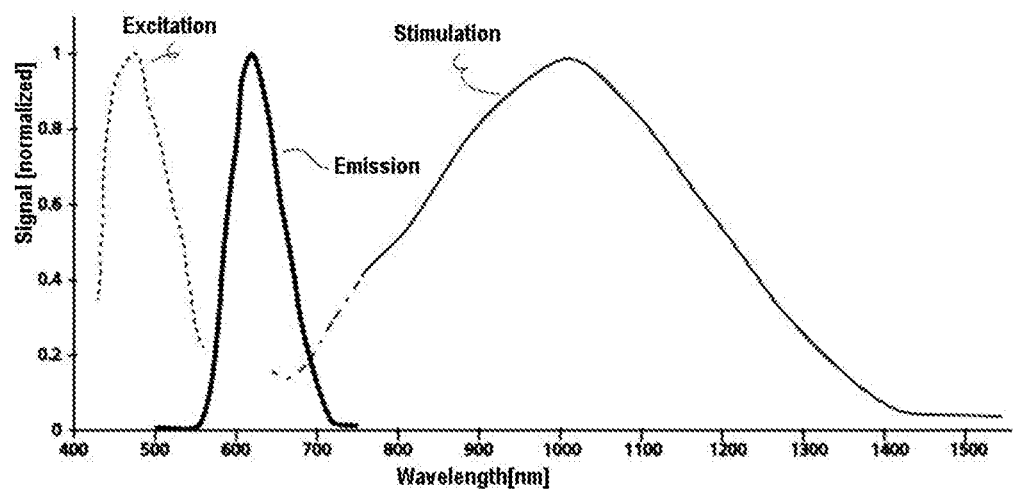
Figure 6:
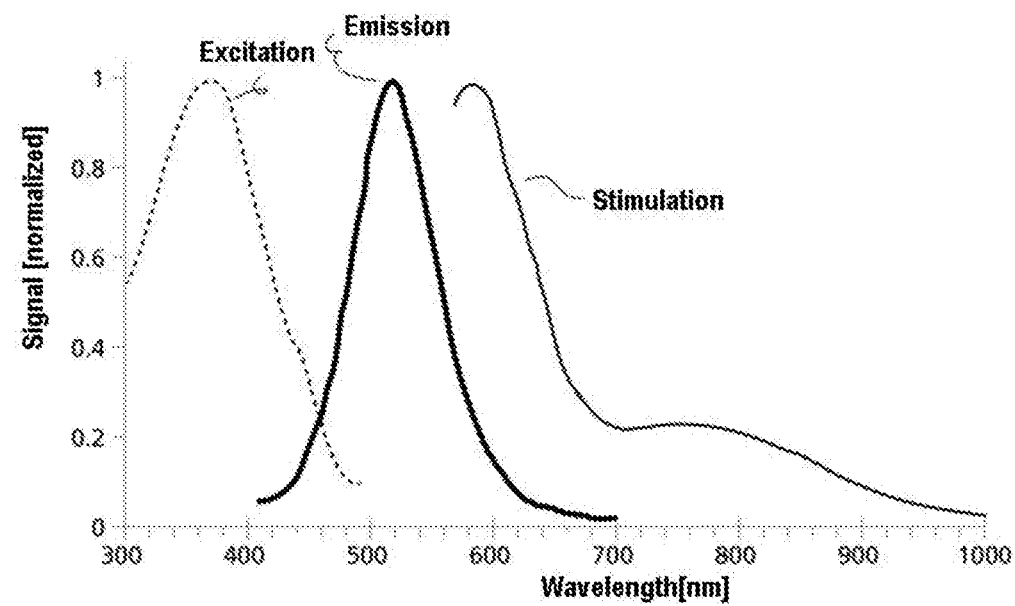
Figure 7:
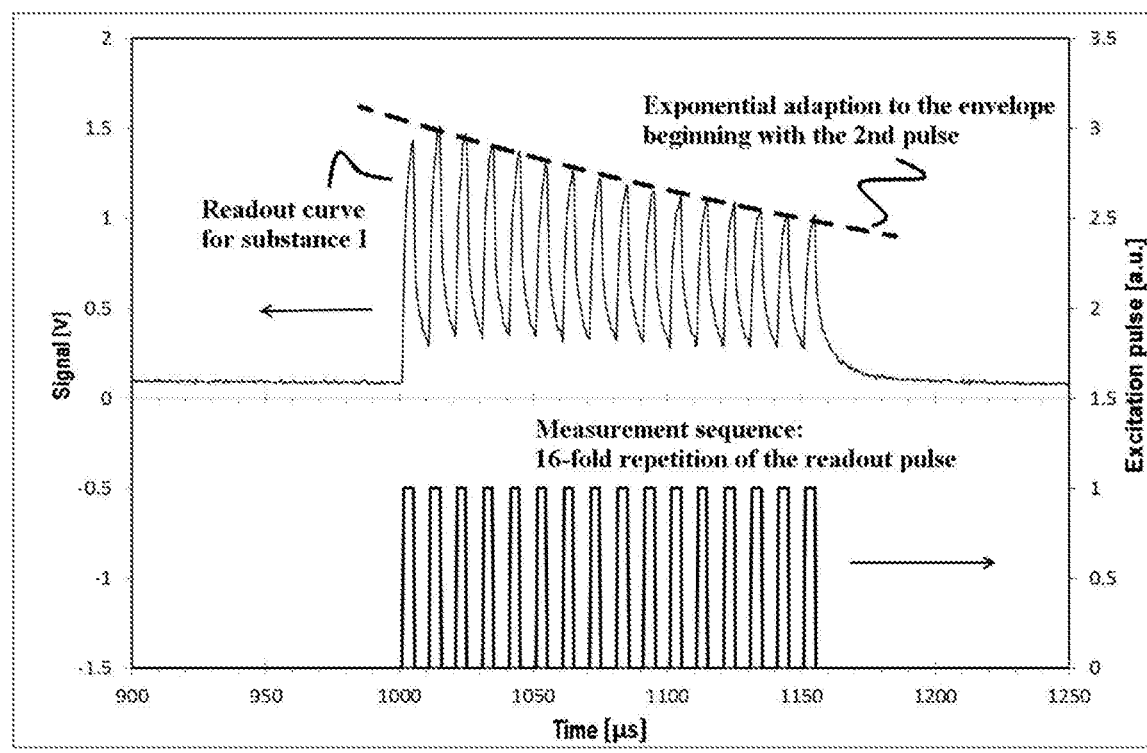
Figure 8:
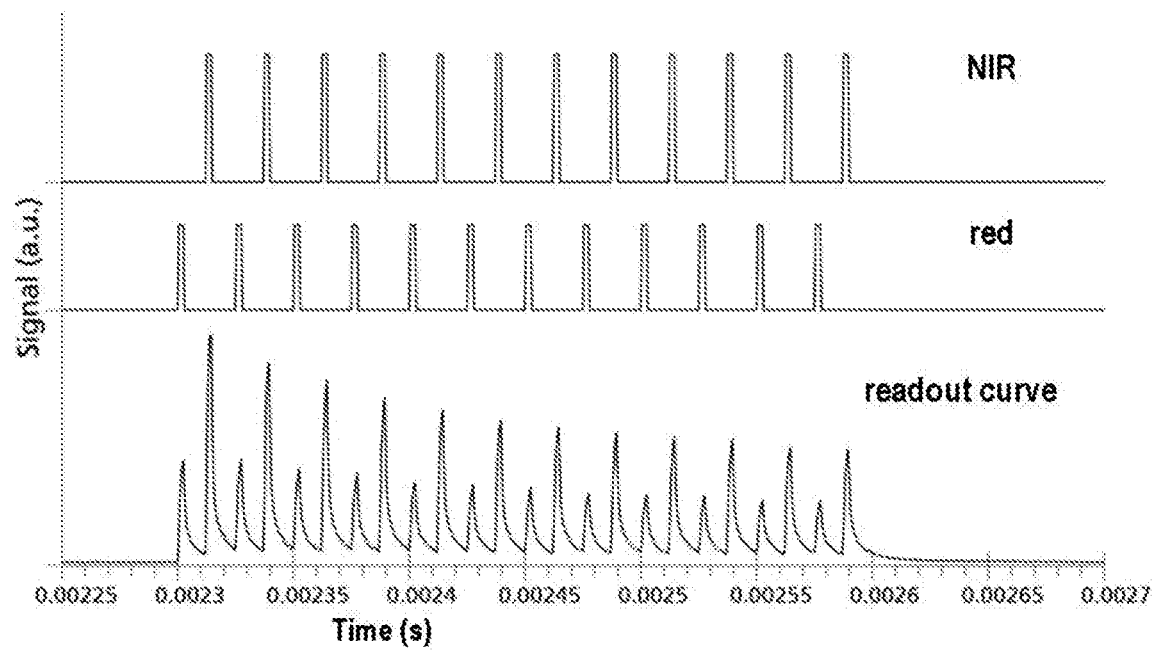
Figure 9:
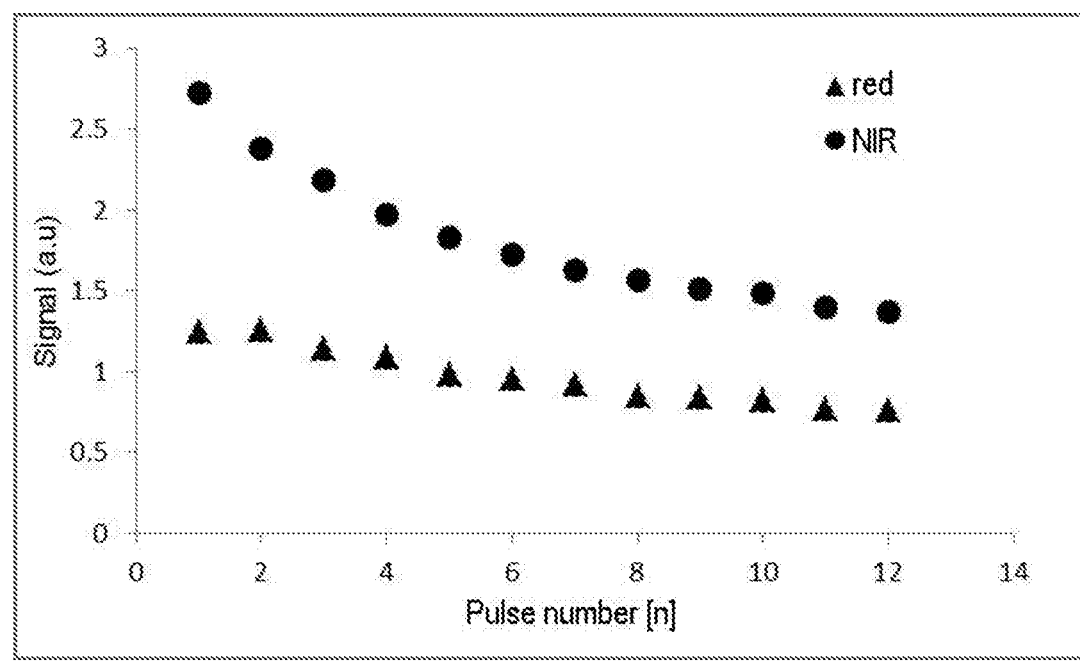
Figure 10A:
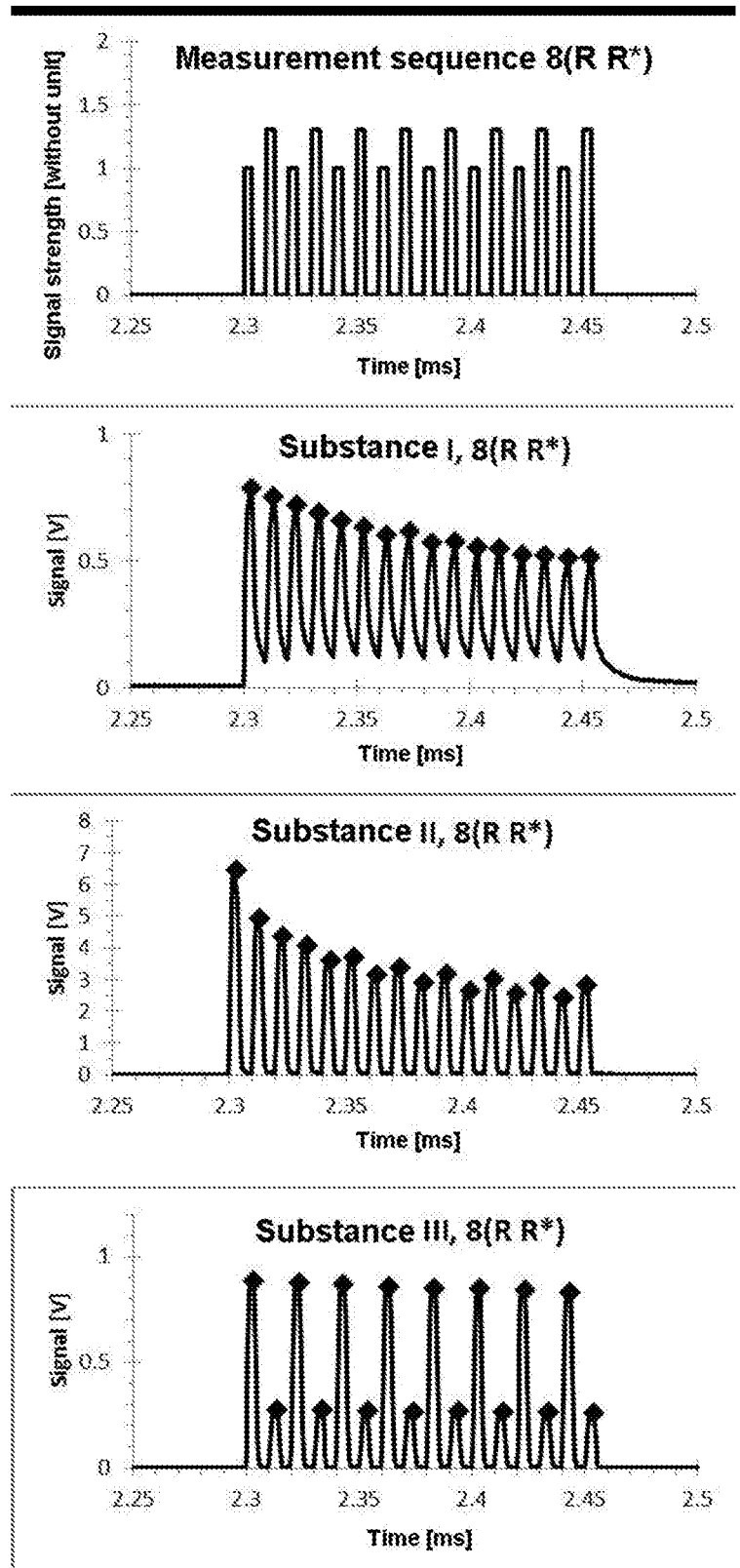
Figure 10B:
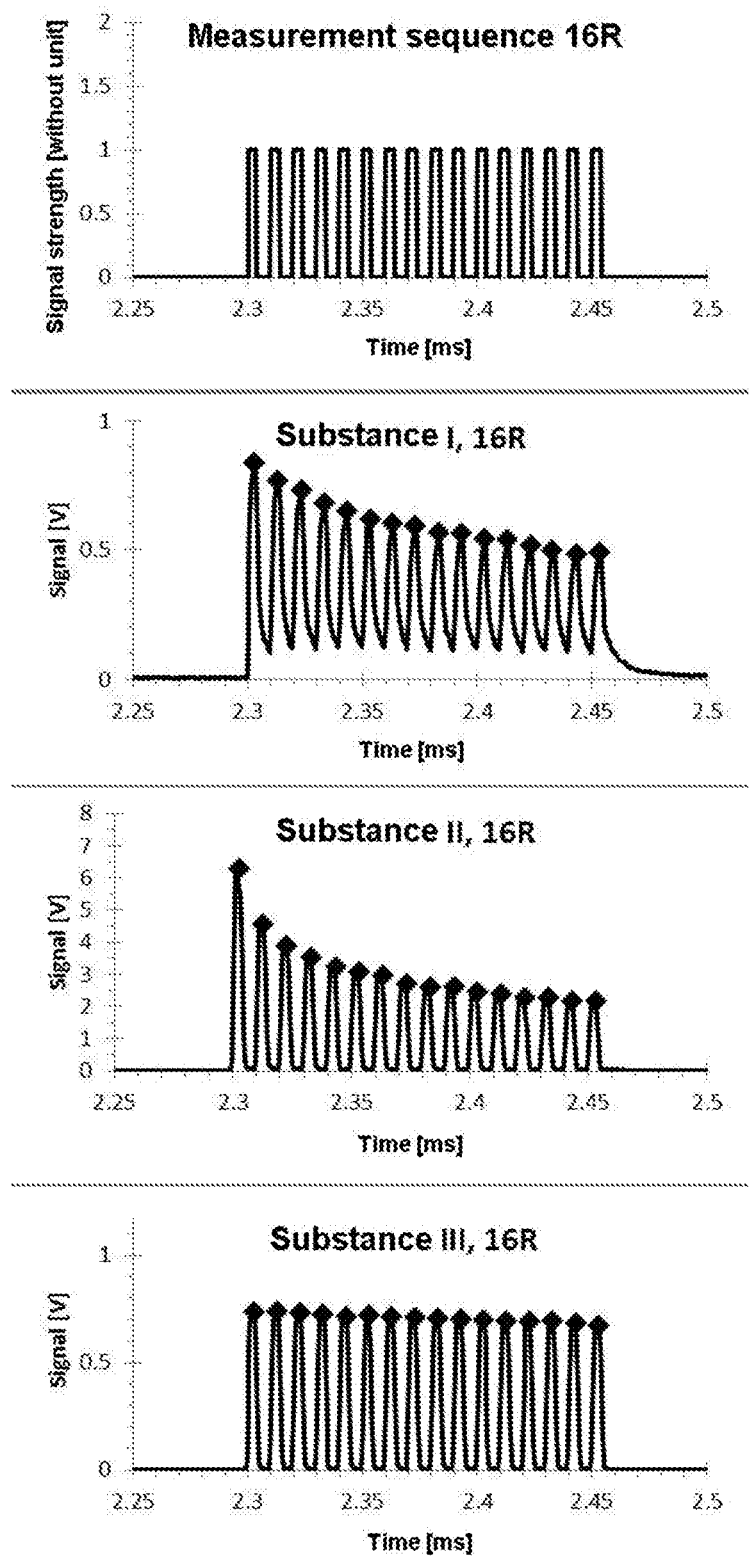
Figure 10C:
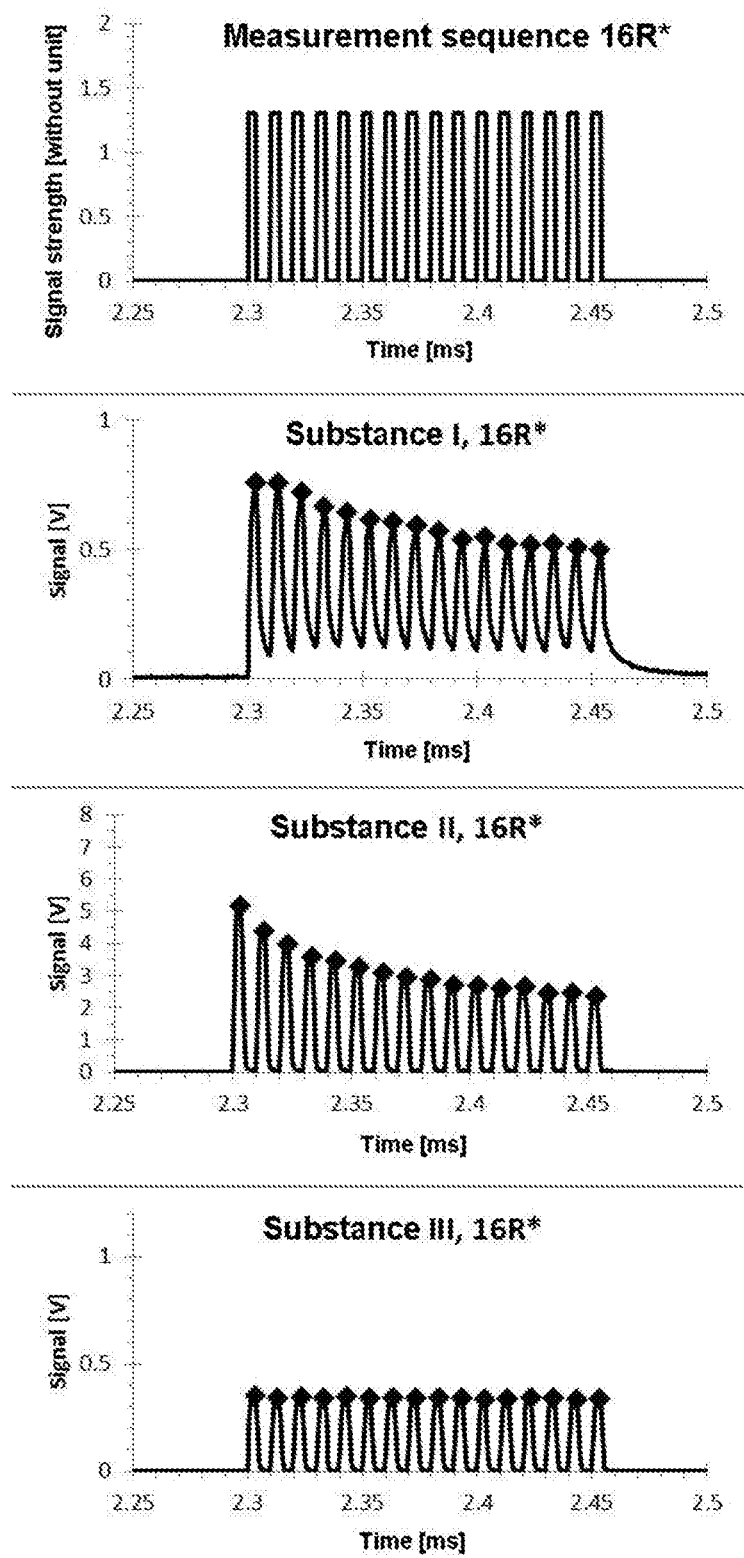
Figure 11:
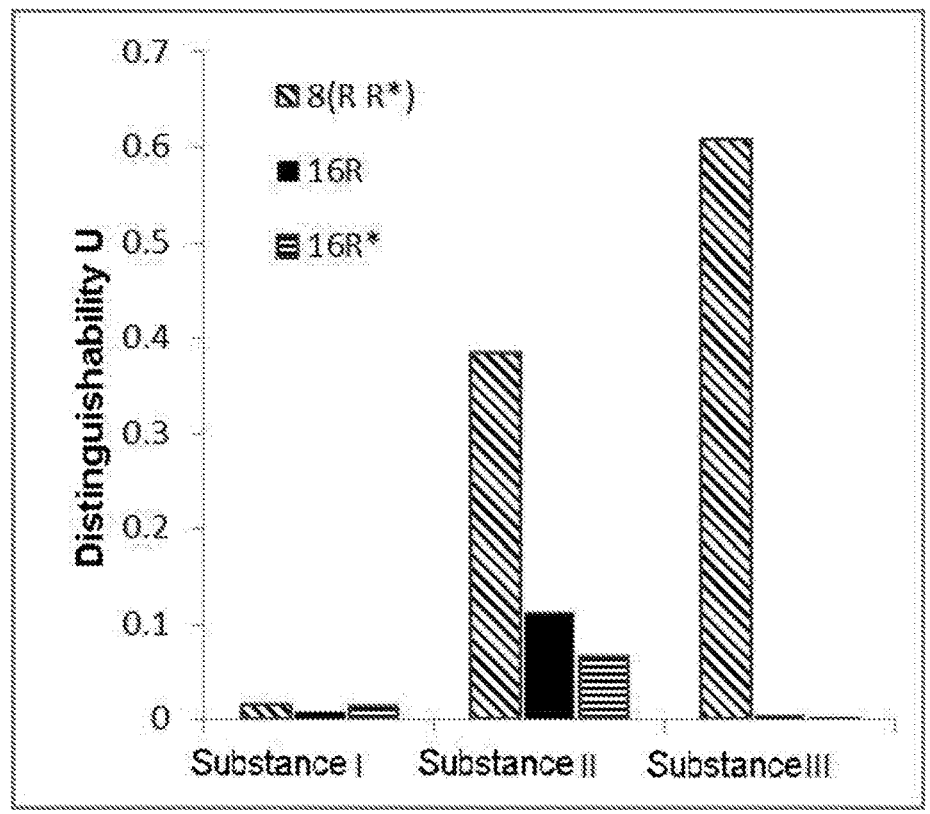
Figure 12:
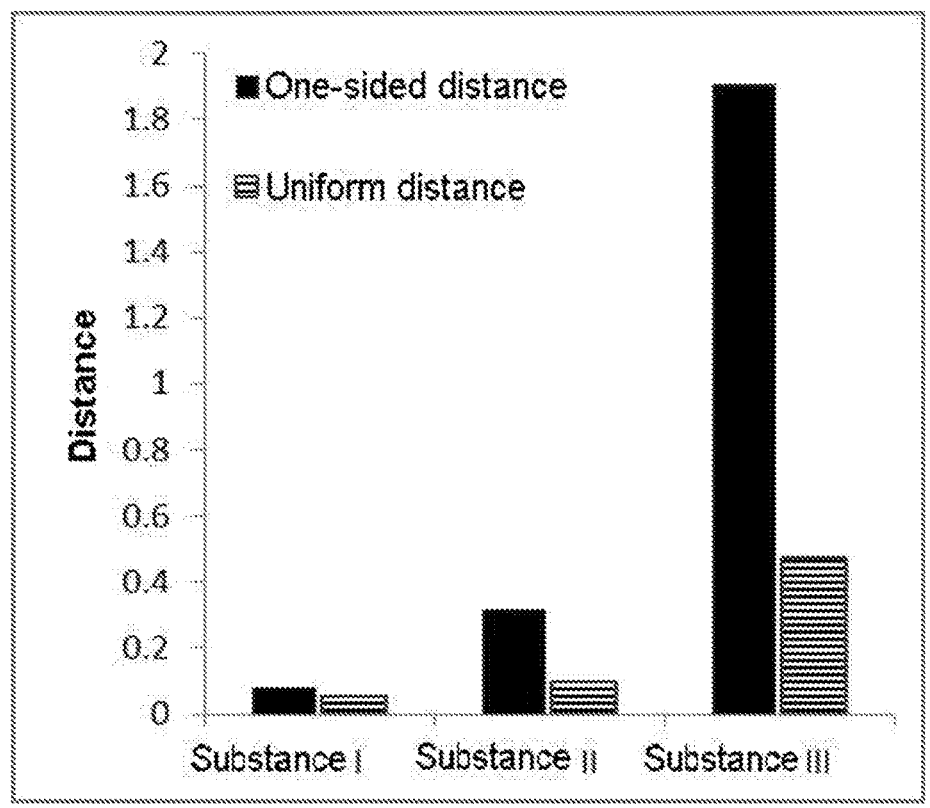

The invention is hereinafter described in connection with FIG. 1 to FIG. 12. In the Figures there are shown:

FIG. 1: a measurement sequence of three pulses P1, P2, and P3, three pulse forms being represented exemplarily, rectangle form, impulse form and modified sawtooth form;

FIG. 2: different charging speeds of three substances (substance I, substance II, substance III);

FIG. 3: normalized signal course under a pulse pair (first pulse "red" followed by pulse "NIR") together with exponential adaptation of the measuring signal;

FIG. 4: excitation spectrum, emission spectrum and readout spectrum of substance I;

FIG. 5: excitation spectrum, emission spectrum and readout spectrum of substance II;

FIG. 6: excitation spectrum, emission spectrum and stimulation spectrum of substance III;

FIG. 7: measurement sequence 16(Q), readout repeated 16 times with readout pulse Q and the associated readout curve for substance I together with the exponential adaptation to the envelope;

FIG. 8: substance I under the alternating sequence succession of the 12 red or NIR-light pulses 12(red NIR) and the readout curve;

FIG. 9: substance I the value of the signal maxima for each pulse for the sequence 12(red NIR);

FIG. 10 a-c: examples of exchangeability:
$1^{st}$ row substance I, $2^{nd}$ row substance II, $3^{rd}$ row substance III; additionally, the maximum signal amplitudes for each readout pulse are respectively marked (rhombuses);

FIG. 10a: employed measurement sequences 8(RR *), readout curves for substances I-III;

FIG. 10b: employed measurement sequence 16R, readout curves for substances I-III;

FIG. 10c: employed measurement sequence 16R*; readout curves for substances I-III;

FIG. 11: comparison of the distinguishability measure U for substance I, substance II and substance III, calculated under the sequences 8(RR *), 16R and 16R*;

FIG. 12: comparison of the one-sided and uniform distance for substance I, substance II and substance III as a proof of exchangeability: Only for substance I both measures have small values. For substance I the readout pulse R and R* are thus exchangeable also on these measures.

Figure 13:
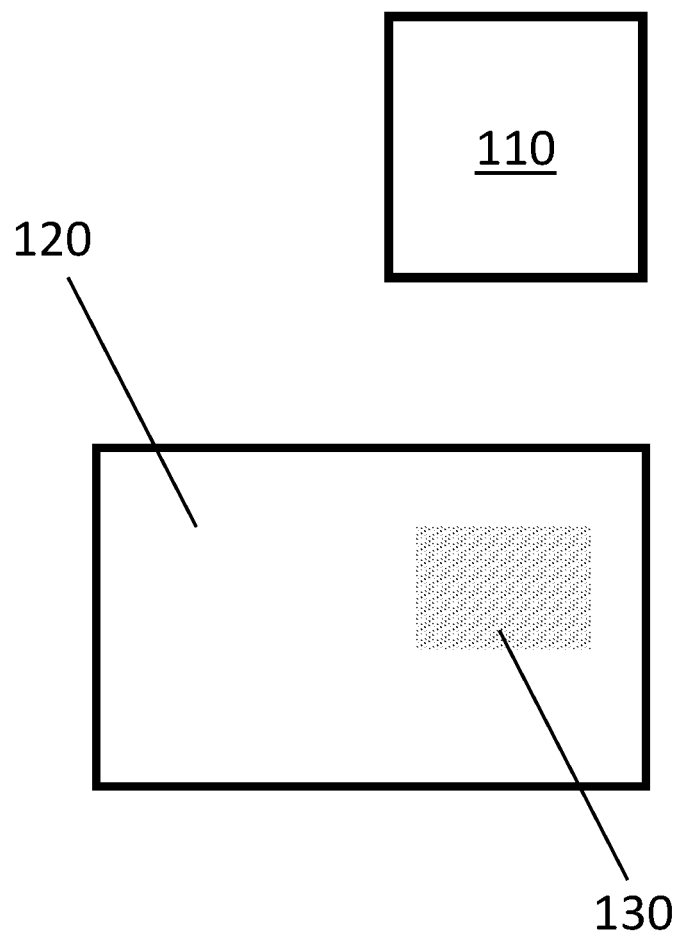

FIG. 13: diagram illustrating performance of a method according to the present disclosure using a sensor and value document.

DETAILED DESCRIPTION OF VARIOUS EMBODIMENTS

Embodiment Example 1

Substance I: Strontium Sulphide Doped with Copper and Bismuth
Manufacture
19.93 g $SrCO_3$, 0.03 g $Bi_2O_3$ and 0.01 g CuS were mixed carefully and poured into a corundum crucible. The mixture was overlaid with 24 g of a 1:1 mixture of elementary sulphur and $Na_2CO_3$ and covered with a lid. Subsequently, the material was annealed at 900° C. for 6 h. The sintered material was crushed, and ground in a swing mill. The finished product is present after a final heating step (12 h at 550° C.). The associated spectra are represented in FIG. 4.

Substance II: Strontium sulphide doped with europium and samarium Preparation analogous to substance I. The associated spectra are represented in FIG. 5.

Substance III: Strontium aluminate doped with europium and thulium Preparation follows Katsumata, T., et al Trap Levels in Eu-doped $SrAl_2O_4$ Phosphor Crystals Co-Doped with Rare-Earth Elements. J.A. Ceram. Soc. In 2006, Vol. 89, 3, P. 932-936. The associated spectra are represented in FIG. 6.

Embodiment Example 2: Measurement Sequence, Readout Repeated 16 Times with Readout Pulse Q, 16(Q)

In the first example, the excited substance I (excitation was effected with a blue light pulse) is read out repeatedly 16 times with the same readout pulse (designated as "Q") and the occurring signal in the region of 490 nm to 550 nm is measured with an avalanche photodiode at 2 MHz sampling frequency and recorded as a readout curve. The parameters describing the readout pulse are summarized in the following table.

TABLE 1

| Parameters of the readout pulse "red" | |
| --- | --- |
| Parameter | Readout pulse Q |
| Wavelength of the laser diode | 638 nm |
| Current | 500 mA |
| Pulse duration | 4 μs |
| Pulse distance | 6 μs |

In FIG. 7 the pulse train of the readout pulse (vertical axis on the right) and the readout curve (vertical axis on the left) are represented versus time. The charging pulse (laser diode 450 nm, current 800 mA, duration 200 s) was effected outside the represented data (at the time t=0). In the measurement data additionally the exponential adaptation to the envelope, beginning with the 2nd pulse, is entered as a dashed line. Substance I additionally has a certain afterglow which becomes visible in the signal rise from the first to the second pulse of the pulse train. This afterglow is superimposed on the OSL signal. This is a very specific property of the system described here including substance I, the measuring apparatus and the measurement sequence used, which property is based on the strong interlacing of these components of the authenticity system. This is advantageously used for the authenticity evaluation of the marked item.

For the evaluation of the readout curve, the lifetime from the exponential adaptation to the envelope can be used, this value is 341.3 μs here. Moreover, the emptying ratio η can be used, which is defined here via the difference of the maximum signal intensity of the $a^{th}$ pulse at the beginning of S(a) and of the $b^{th}$ pulse near the end of the sequence S(b), weighted with the sum of these intensities, $$\eta = \frac{S(a) - S(b)}{S(a) + S(b)}.$$

In the represented case, for a=2, b=15 there results the value η=0.198.

Furthermore, for the evaluation, the exact shape of the readout curve can compared with a reference curve, or selectively further characteristic aspects of the curve, such as e.g. the build-up or decay times of the intensities of the single pulses or the respective afterglow portion can be compared with corresponding reference values.

Embodiment Example 3: Measurement Sequence, Alternating Readout 12(Red NIR)

In this example, the charged substance I is exposed to the sequence 12(red NIR) and the occurring signal in the region of 500 and 550 nm is measured: initially, the substance is charged with the process W (the charging pulse ends at the time t=300 µs), after a waiting period (delay, 2 ms) one reads out at first with the process red, then with the process NIR. The waiting period ensures that no afterglow contributes to the signal. A different (in particular shorter) waiting period is possible, but leads to a different readout curve because of the afterglow and other relaxation effects. Ultimately, a measurement sequence with a different waiting period represents a different measurement sequence. This succession of the readout pulses is repeated 12 times. The processes are defined in Table 2 and represented in FIG. 8. By way of example, the authenticity analysis is effected on the basis of several measure values.

TABLE 2

Parameters of the charging pulse W and the readout pulses "red" and "NIR"

| | Processes and parameters | | |
|---|---|---|---|
| | W | red | NIR |
| Wavelength | 455 nm | 638 nm | 853 nm |
| Current | 1000 mA | 800 mA | 1000 mA |
| Rel. intensity after attenuator | 100% | approx. 40% | 100% |
| Pulse duration | 80 µs | 2.5 µs | 2.5 µs |
| Pulse distance | 2 ms | 11.25 µs | 11.25 µs |

The storage properties used in this invention as an authenticity feature can be determined with the help of the readout curve. For this purpose, there are ascertained, for example, the signal maxima (or the integral of the signal for each pulse) of the processes red and NIR and represented as a time series:

As visible in FIG. 9, falling curves are the result for each of the processes. The quantities red(n) or NIR(n) designate the maximum signal, the quantities sum_red(n) or sum_NIR(n) the integrated signal associated with the $n^{th}$ application of the respective process. Table 3 summarizes some possible measure values of the invention and the associated results in this example.

TABLE 3

Examples of characteristic measure values and their evaluation for substance I

| | Result | Comment |
|---|---|---|
| $\gamma_{rot} = \dfrac{\text{rot}(1) - \text{rot}(12)}{\text{rot}(12)}$ | 0.6 | Emptying ratio for the readout pulse "red" |
| $\gamma_{NIR} = \dfrac{\text{NIR}(1) - \text{NIR}(12)}{\text{NIR}(12)}$ | 1.0 | Emptying ratio for the readout pulse "NIR" |
| $b = \dfrac{1}{11} \sum_{n=2}^{12} \dfrac{\text{NIR}(n)}{\text{rot}(n)}$ | 1.83 | Mean value of the signal intensity ratios of the two readout processes "red" and NIR. The first pulse pair is ignored in order to intercept possible transient behaviour. The ratio NIR(n)/red(n) for n > 2 is near 1.83 within ±5% deviation. |
| $B = \dfrac{1}{11} \sum_{n=2}^{12} \dfrac{\text{sum\_NIR}(n)}{\text{sum\_rot}(n)}$ | 1.66 | Mean value of the ratio of the signal intensities of the two readout processes "red" and "NIR", integrated over the respective pulse. The first pulse pair is ignored in order to intercept possible transient behaviour. The ratio sum NIR (n)/sum red(n) for n > 2 is near 1.66 within ±5% deviation. |
| $d = \dfrac{\text{NIR}(2) - \text{NIR}(12)}{\text{rot}(2) - \text{rot}(12)}$ | 2.0 | Ratio of the signal intensity differences of the two readout processes "red" and "NIR". The first pulse pair is ignored in order to intercept possible transient behaviour. |
| $D = \dfrac{\text{NIR}(2) - \text{rot}(12)}{\text{rot}(2) - \text{NIR}(12)}$ | −15.2 | A possible measure for the variability of the effect of the two readout processes "red" and "NIR". The first pulse pair is ignored in order to intercept possible transient behaviour. |

Besides the entire readout curve, also each pulse can be viewed. The build-up or decay behaviour of a single pulse gives characteristic information about the time behaviour of the light center as well as possibly occurring afterglow. FIG. 3 shows the normalized signal course under a pulse pair red/NIR, i.e. first pulse "red" followed by pulse "NIR" together with exponential adaptations of the measuring signal to the part of the readout curve in which respectively the readout pulse is off and the signal has substantially decayed. From these data, the exponent of adaptation can be utilized as a further measure value. Alternatively, intensity ratios can be formed at different times and used as a measure for the characteristic time behaviour of the luminescence.

TABLE 4

Examples of a characteristic measure value which is based on luminescence decay times and afterglow and the evaluation thereof for substance I

| | Result | Comment |
|---|---|---|
| Exponential adaptation to the signal pulses normalized to the maximum of NIR, as of a distance of 2.5 μs from the pulse maximum, the exponent thereof | −122144 s$^{-1}$ (NIR) −114967 s$^{-1}$ (red) | This quantity describes the luminescence lifetime or also portions of the afterglow |

Embodiment Example 4: Exchangeability and Libraries

In this example, substance I is incorporated as an authenticity feature in a bank note paper, the substances II and III represent an alternative substance and an imitator. Substance I and II noticeably differ spectrally, while substance I and III have very similar emissions.

At first, two readout pulses are established for the feature substance I, which are exchangeable in their effect, namely readout pulse R and R*. The parameters of the two readout pulses are summarized in the Table 5 below. Exchangeability means that the order of the two readout pulses can be exchanged within a sequence without the readout curve being changed noticeably.

TABLE 5

Parameters of the readout pulse R and R*

| | R | R* |
|---|---|---|
| Wavelength | 638 nm | 853 nm |
| Current | 800 mA | 1000 mA |
| Rel. intensity after attenuator | approx. 40% | 100% |
| Pulse duration | 2 μs | 2 μs |
| Pulse distance | 8 μs | 8 μs |

Suitable measurement sequences which include R and R* can test the exchangeability for the proof of authenticity. An example of such sequences is the sequence 8(R R *) in which R and R* alternate. The sequence begins with R and comprises a total of 16 readout pulses. The measurement sequence and the readout curve for the substances I, II and III charged before (by a blue light pulse) under this sequence are represented in FIG. 10a to c.

While the readout curve for substance I shows a uniform fall of the intensity, the readout curve for substance II and in particular for substance III is clearly modulated. If one views also the equally long measurement sequences which include only one of the two readout pulses, namely 16R and 16R*, the readout curves for all three substances (I, II, III) behave in a uniformly falling fashion.

For the proof of authenticity, distinguishability measures are defined. Such a measure describes, to what extent two pulses within a sequence are distinguishable in their effect. For the measurement sequence 8(R R *) the distinguishability measure U is determined as follows: At first, for each readout pulse the value of the associated maximum of the readout curve is determined (marked as rhombuses in FIG. 10a to c). This value is designated as a pulse intensity $P_n$, the index n designating the n$^{th}$ pulse of the measurement sequence. For the viewed n$^{th}$ pulse of the measurement sequence it is calculated how far it is away from the geometric mean of the pulse intensities of the neighboring pulses of the measurement sequence, i.e.

$$d_n = \sqrt{P_{n-1} P_{n+1}} - P_n,$$

where n is from 2 to 15, because the first and the last pulse have no neighbours. The standard deviation of the values do is designated as the distinguishability measure U. In FIG. 11, there is respectively represented the distinguishability measure U for the measurement sequence 8(R R *) for the substances I, II and III. For comparison, moreover, the value of the distinguishability measure U is respectively drawn in for the sequences 16R and 16R*. Substance I from all three measurement sequences has a small distinguishability, U (substance I)<0.1. The two other substances have a distinguishability U>0.3 under the measurement sequence 8 (R R *). For substance II and substance III, the readout pulse R and R* are not exchangeable in their effect.

Besides, for the measurement under the sequence 8(R R *) there is also used the sequence 16 R* and/or 16R. The readout curve under 16 R* serves as an estimator for the readout curve and thus for the pulse intensities under the measurement sequence 8(R R *). For the proof of authenticity, the one-sided distance or the uniform distance of the readout curves is determined. For this purpose, first the pulse intensities of the readout curves are normalized such that respectively the pulse intensity of the first readout pulse of a measurement sequence is set to the value 1. The such normalized pulse intensity of the n$^{th}$ pulse under a measurement sequence is designated as $\hat{P}_n$.

The one-sided distance ε here results from $$\varepsilon = \sqrt{\sum_{n=1}^{16} \left(\hat{P}_n[8(RR^*)] - \hat{P}_n[16R^*]\right)^2}$$

The uniform distance δ here is calculated via $$\delta = \frac{1}{16} \sum_{n=1}^{16} \sqrt{\left(\hat{P}_n[8(RR^*)] - \hat{P}_n[16R^*]\right)^2 + \left(\hat{P}_n[8(RR^*)] - \hat{P}_n[16R^*]\right)^2}$$

Both measures ultimately describe how readily the effect of the readout pulses R and R* are exchangeable, the measurement sequences 16R and 16R* providing estimators for the measurement sequence 8(R R *).

The FIG. 12 summarizes the values of the one-sided and uniform distance for substance I, substance II and substance III, calculated as stated above with the data of FIG. 10a to c. Only for substance I both measures have small values ($\epsilon$<0.1; $\delta$<0.1). Only for substance I, the readout pulses R and R* are exchangeable in their effect also on these measures.

This approach can be generalized, and not only alternating pulse trains but also more complicated measurement sequences can be used. Exchangeability can be also defined for more than two different readout pulses. For the proof of authenticity, suitable measurement sequences are thus summarized to reference libraries. Here, for example the mentioned measurement sequences 8(R R *), 16R and 16 R* belong to one reference library. A further sequence of this reference library is summarized from groups of the readout pulses R and R*, whereby in the measurement sequence at first R is executed eight times and afterwards R* is executed eight times, i.e. 8R8R*. Also for this measurement sequence, a distinguishability measure can be defined and/or the one-sided and/or the uniform distance can be calculated and be used for the proof of authenticity. Furthermore, the reference library includes further measurement sequences of the length 16, different permutations of the succession of R and R* being used.

As needed, short and long measurement sequences expand the reference library, for example, the sequence RRR* or R*RR are also part of the library as 100R, 100R*, 100(RR*), which can be utilized, for example, for the proof of authenticity in different employment scenarios, e.g. quality assurance of the feature, of an intermediate product or of the bank note without disclosing the evaluation process running in the machine bank note processing. Alternatively, likewise, different check locations of the banknotes (e.g., POS cash point versus central banks) may use different measurement sequences of the reference libraries.

As needed, measurement sequences using other readout pulses are added to the reference library. These readout pulses include, for example, those with longer pulse duration (10 µs, 100 µs) and/or with other wavelengths (for example, 488 nm, 532 nm, 658 nm, 758 nm, 808 nm, 915 nm, 980 nm) and/or other intensities of the light sources. With these pulse sequences (which are formed in analogy to the mentioned ones and/or other pulse orders) it is ensured that a substance can be reliably proven on different sensors. In particular, the reference library also includes measurement sequences of at least three different readout pulses, for example, the sequence 4(SRR*), the readout pulse S being defined by the parameters in the subsequent Table 6: Parameters of the readout pulse.

TABLE 6

| Parameters of the readout pulse | |
|---|---|
| | S |
| Wavelength | 1064 nm |
| Current | 1000 mA |
| Rel. intensity after attenuator | approx. 40% |
| Pulse duration | 4 µs |
| Pulse distance | 8 µs |

This additional readout pulse serves for the differentiation of substance I and substance II in the reference library and causes a strong signal for substance II, while substance I delivers only a weak signal.

Embodiment Example 5: Superimposed Readout Pulses and Third Readout Pulse

In a further example, substance I is incorporated into a suitable transparent lacquer system and doctored onto a carrier foil (10 weight percent of feature powder in the lacquer, wet film thickness 50 µm).

In a reference library three query sequences are deposited.

As a first query sequence a pulse train is used in which at first 6 pulses of the type Q are employed, as in Example 2. Subsequently, the authenticity feature is illuminated with three further pulses of the type Q superimposed by a long lasting pulse L (wavelength 780 nm, energization 1000 mA, pulse duration 30 µs, pulse distance −30 µs). The negative pulse distance ensures the superimposition. Via an attenuator the illuminance is set such that the signal intensity caused by the first pulse of the superimposition is twice as large as the signal intensity caused by the first pulse Q of the query sequence. In a proof of authenticity this is checked and the readout speeds are determined for both parts of the query sequence. During the superimposition the authenticity feature can be read out substantially faster.

In comparison to the authenticity feature, substance II and substance III have a ratio of the signal intensity of the first pulse of the superimposition to the signal intensity of the first pulse of the query sequence which deviates from the factor 2. The influence of the superimposition on the readout speed is substantially lower for substance II and substance III.

As a second query sequence the alternating sequence 8(RR *) of Example 4 is deposited. The proof of authenticity follows Example 4.

As a third query sequence an alternating succession 5(RTR*) is employed. Pulse T uses the same illumination source as L (780 nm), but is defined as a short pulse (pulse duration 1 µs, pulse distance 4 µs). Again, the pulses R and R* are exchangeable for the authenticity feature. Pulse T does not disturb the exchangeability.

Embodiment Example 6: Different Effects of Charging Pulses

In FIG. 2, the different charging speeds of the three OSL substances, substance I, substance II and substance III, are evaluated. For this purpose, respectively the same succession of readout pulse and charging pulse repeated ten times is composed into one sequence and the effect thereof on the three OSL substances is compared.

The readout pulse measures here the effect of the previously running charging pulse. From the maxima of the readout pulses there thus results an evaluateable curve for the charging speed of these substances. Here, one recognizes significant differences in the effect of the charging pulses on the substances I, II or III: While the charging pulses show no significant effect on substance I, a significant increase of the intensity of the optical emission is observed for substance II in response to the respectively associated readout process. With a suitable quantitative evaluation the substances II and III can also be differentiated from each other with the help of their charging behaviour.

Embodiment Example 7: Charging Processes with Different Efficiency

The OSL substances substance I and substance II are subjected to a repeated sequence of
5× charging pulse 280 nm
5× readout pulse 900 nm
4× charging pulse 450 nm
4× readout pulse 900 nm.

FIG. 13 provides a diagram illustrating performance of a method according to the present disclosure. In a suitable sensor 110 the value document 120 marked with an authenticity feature 130 having an optical storage phosphor according to the invention is measured with one or several sequences and from the associated results characteristic memory properties are determined. By comparison with a specification authenticity is proven (example: in an OSL substance memory strength, exchangeability rules and sensitivity are determined with different sequences with a sensor 110 realizing at least one charging and two different readout processes and are compared with the specification).

Here, for substance I and for substance II there is observed a respectively quantitatively different charging effect for the two charging processes at 280 nm or at 450 nm, with the help of which the two substances can be differentiated.

For a person skilled in the art it is a matter of course that the mentioned examples are stated merely exemplarily and, if possible, other combinations and values ranges, as stated, are conceivable. The stated examples should therefore not be read as limiting, but can also be read along in combination with the different features stated herein.

The invention claimed is:

1. A method for checking an authenticity feature having an optical storage phosphor, comprising the steps of:
    a. capturing at least a first measurement value, including a storage charge and/or a light emission of the optical storage phosphor;
    b. subjecting the optical storage phosphor to at least one charging process;
    c. capturing at least a second measurement value, including a storage charge and/or a light emission of the optical storage phosphor; and
    d. quantitatively determining an effect of the charging process on the optical storage phosphor from the at least one first and second measurement value;
    wherein the method has at least one query sequence, comprising at least two readout processes,
    wherein from the first readout process a first readout measurement value and from the second readout process a second readout measurement value are captured: and the method comprises the steps of:
    d1. creating a readout measurement value time series respectively associated with the at least one query sequence, comprising at least the first readout measurement value respectively associated with the first readout process and the second readout measurement value respectively associated with the second readout process; and
    e. evaluating the readout measurement value time series respectively associated with the query sequence for determining a dynamic behaviour from the readout measurement value time series under the respectively associated query sequence;
    wherein in step d) the evaluating of the readout measurement value time series is effected quantitatively in order to determine at least one characteristic memory property of the optical storage phosphor.

2. The method according to claim 1, wherein the optical storage phosphor has light centers and trap centers, wherein, charge carriers present in the storage phosphor are at least partially transferred to the trap centers by the charging process in step b.

3. The method according to claim 2, wherein the method comprises at least one readout process and the first and/or second measurement value are captured independently of a readout process; wherein by the at least one readout process at the trap centers, stored charge carriers of the trap centers are excited and they transition to the light centers, the charge carriers radiantly relaxing at the light centers.

4. The method according to claim 1, wherein the first and/or the second measurement value are captured independently of the readout processes.

5. The method according to claim 4, wherein each readout process comprises at least one readout pulse or a continuous readout intensity-modulated over time.

6. The method according to claim 5, wherein the readout pulse has a centroid wavelength from a wavelength region of 360 to 1200 nm and/or the pulse duration is in a region of 1 µs and 100 ms.

7. The method according to claim 4, comprising a repeated and/or respectively alternating succession of the at least one charging process and the at least one readout process.

8. The method according to claim 1, wherein at least the first and/or the second measurement values are captured as the first and/or the second readout measurement values which are accordingly captured based on a detection of a light emission in response to the at least two readout processes,
    wherein the first measurement value is captured as a readout measurement value based on a detection of a light emission in response to the first readout process and the second measurement value as a readout measurement value based on a detection of a light emission in response to the second readout process.

9. The method according to any claim 8, wherein by the readout measurement value time series of at least two readout measurement values the charging speed of the optical storage phosphor is determined.

10. The method according to claim 1, wherein the charging process comprises at least one charging pulse or a continuous charging intensity-modulated over time.

11. The method according to claim 10, wherein the charging pulse has a wavelength region of 240 nm and 550 nm, and/or the pulse duration in a region of 1 µs and 100 ms.

12. The method according to claim 10, wherein at least a first charging pulse of the at least one charging pulse differs from another charging pulse at least in pulse duration and/or pulse interval duration.

13. The method according to claim 1, wherein the method comprises two query sequences which respectively comprise at least the first readout process and the second readout process and wherein the captured readout measurement values are different for each query sequence.

14. The method according to claim 1, wherein the at least one first charging process further comprises at least one charging sequence, said at least one charging sequence applied to the optical storage phosphor before the at least one query sequence.

15. The method according to claim 1, wherein the at least one characteristic memory property is selected from: persistence, memory depth, memory strength, sensitivity, specificity, exchangeability, association, continuity, latency, saturation, isolation, charging speed and/or readout speed.

16. The method according to claim 1, wherein the step of evaluating the readout measurement value time series for at least one characteristic memory property of the optical storage phosphor comprises a determination of the shape of the temporal course of the curve of the readout measurement value time series or a determination of parameters which describe the temporal course of the curve of the readout measurement value time series.

17. The method according to claim 1, wherein the at least one charging process differs from another charging process at least in wavelength and/or intensity and/or pulse length.

18. The method according to claim 1, wherein by subjecting the optical storage phosphor to the at least one charging sequence and/or at least one preparation step a threshold emission is set.

19. The method according to claim 1, further comprising step f. matching the determined dynamic behaviour of the readout measurement value time series with at least one reference, and g. recognizing the authenticity of the authenticity feature as a function of the matching f.

20. The method according to claim 1, further comprising step h. subjecting the optical storage phosphor to at least one thermalizing sequence.

21. An authenticity feature having an optical storage phosphor for checking authenticity of the authenticity feature with a method according to claim 1,
   wherein the optical storage phosphor has a charging spectrum with at least one distinctive spectral structure which in a charging efficiency is configured varying with the wavelength,
   wherein a readout spectrum has at least one local minimum, in which the charging efficiency is reduced by at least 10% in comparison to a flanking maxima.

22. A value document having at least one authenticity feature according to claim 21.

23. A method for checking an authenticity feature having an optical storage phosphor, comprising the steps of:
   a. capturing at least a first measurement value, including a storage charge and/or a light emission of the optical storage phosphor;
   b. subjecting the optical storage phosphor to at least one charging process;
   c. capturing at least a second measurement value, including a storage charge and/or a light emission of the optical storage phosphor; and
   d. quantitatively determining an effect of the charging process on the optical storage phosphor from the at least one first and second measurement value;
   wherein the method has at least one query sequence, comprising at least two readout processes,
   wherein from the first readout process a first readout measurement value and from the second readout process a second readout measurement value are captured;
   and the method comprises the steps of:
   d1. creating a readout measurement value time series respectively associated with the at least one query sequence, comprising at least the first readout measurement value respectively associated with the first readout process and the second readout measurement value respectively associated with the second readout process; and
   e. evaluating the readout measurement value time series respectively associated with the query sequence for determining a dynamic behaviour from the readout measurement value time series under the respectively associated query sequence;
   wherein the method comprises two query sequences which respectively comprise at least the first readout process and the second readout process and wherein the captured readout measurement values are different for each query sequence.

* * * * *